United States Patent
Baron et al.

(10) Patent No.: US 7,076,444 B1
(45) Date of Patent: Jul. 11, 2006

(54) ELECTRONIC OFFER MANAGEMENT SYSTEM AND METHOD THEREOF

(75) Inventors: Penny Baron, Highland Park, IL (US); Wayne Levy, Deerfield, IL (US); Brian Rock, Kildeer, IL (US); Timothy Halfman, Schaumburg, IL (US); Mark S. Smith, West Hartford, CT (US)

(73) Assignee: Priva Technologies, Inc., Dunn Loring, VA (US)

( * ) Notice: Subject to any disclaimer, the term of this patent is extended or adjusted under 35 U.S.C. 154(b) by 748 days.

(21) Appl. No.: 09/665,790

(22) Filed: Sep. 20, 2000

(51) Int. Cl.
*G06Q 50/00* (2006.01)

(52) U.S. Cl. ......................................................... 705/14

(58) Field of Classification Search .................... 705/1, 705/14
See application file for complete search history.

(56) References Cited

U.S. PATENT DOCUMENTS

| | | | |
|---|---|---|---|
| 5,502,636 A | 3/1996 | Clarke | |
| 5,504,675 A | 4/1996 | Cragun et al. | |
| 5,612,868 A | 3/1997 | Off et al. | |
| 5,774,868 A | 6/1998 | Cragun et al. | |
| 5,855,007 A | 12/1998 | Jovicic et al. | |
| 5,907,830 A | 5/1999 | Engel et al. | |
| 5,970,469 A | 10/1999 | Scroggie et al. | |
| 5,999,914 A | 12/1999 | Blinn et al. | |
| 6,009,411 A | 12/1999 | Kepecs | |
| 6,014,634 A | 1/2000 | Scroggie et al. | |
| 6,041,308 A | 3/2000 | Walker et al. | |
| 6,041,309 A | 3/2000 | Laor | |

FOREIGN PATENT DOCUMENTS

EP  0 923 039 A1 * 6/1999

OTHER PUBLICATIONS

ValuPage web site, Wayback Machine Archive May 11, 2000; 1 page.*
Planet U web site, Wayback Machine Archive; Aug. 18, 2000; 1 page.*
Planet U web site, Wayback Machine Archive; Nov. 9, 2000; 1 page.*
No author; ShoppingList.com Partners with ValuPage to Offer Grocery Coupons to Online Visitors; Sep. 21, 1999; PR Newswire; 2 pages.*

* cited by examiner

*Primary Examiner*—Thomas A. Dixon
(74) *Attorney, Agent, or Firm*—Thompson Coburn LLP

(57) ABSTRACT

An electronic offer management system and method thereof is disclosed. In particular, the system comprises means for receiving information related to a plurality of offers distributed by a plurality of different offer distributors to customer for redemption at plurality of stores, means for automatically routing the information related to an offer to a point-of-sale system of each store in which the offer can be redeemed, and means for automatically clearing the offers redeemed by the customer at the stores. The system further comprises means for automatically reconciling financial obligations associated with each cleared offer, as well means for dynamically profiling customers so that improved offer targeting can be achieved.

33 Claims, 6 Drawing Sheets

|  | Population | Circulation | Media Cost/M | Total Media Cost | Redemption Rate | Redeemers | Discount | Handling | Total Cost |
|---|---|---|---|---|---|---|---|---|---|
| Non Sauce Users | 400,000 | 400,000 | $7.50 | $3,000 | 0% | - | $0.50 | $0.15 | $3,000 |
| Sauce Users | 1,100,000 | 1,100,000 | $7.50 |  |  | - |  |  | $0 |
| Brand Loyal | 275,000 | 275,000 | $7.50 | $2,063 | 50% | 137,500 | $0.50 | $0.15 | $91,438 |
| Brand Preferred | 235,000 | 235,000 | $7.50 | $1,763 | 30% | 70,500 | $0.50 | $0.15 | $47,588 |
| Brand Switchers | 500,000 | 500,000 | $7.50 | $3,750 | 40% | 200,000 | $0.50 | $0.15 | $133,750 |
| Brand Loyal to Competitor | 90,000 | 90,000 | $7.50 | $675 | 0% | - | $0.50 | $0.15 | $675 |
| Total Population | 1,500,000 | 1,500,000 |  | $11,250 |  |  |  |  | $276,450 |
|  | Percent Incremental Purchases | Incremental Purchases | Cost per Incremental Purchase |  |  |  |  |  |  |
| Non Sauce Users | 0% | - | NA |  |  |  |  |  |  |
| Sauce Users |  |  |  |  | Cost |  |  |  |  |
| Brand Loyal | 0% | - | NA |  | Media |  | $11,250 |  |  |
| Brand Preferred | 25% | 17,625 | $2.70 |  | Redemption |  | $204,000 |  |  |
| Brand Switchers | 60% | 120,000 | $1.11 |  | Admin. |  | $61,200 |  |  |
| Brand Loyal to Competitor | 0% | - | NA |  | Value |  |  |  |  |
| Total |  | 137,625 | $2.01 |  | Incremental Margin |  | $240,844 |  |  |
|  |  |  |  |  | Cost |  | $276,450 |  |  |
|  |  |  |  |  | Net Value |  | ($35,606) |  |  |

FIG. 3A

|  | Population | Circulation | Media Cost/M | Total Media Cost | Redemption Rate | Redeemers | Discount | Handling | Total Cost |
|---|---|---|---|---|---|---|---|---|---|
| Non Sauce Users | 400,000 | 300,000 | $8.50 | $2,550 | 0% | - | $0.50 | $0.15 | $2,550 |
| Sauce Users | 1,100,000 |  | $8.50 |  |  | - |  |  | $0 |
| Brand Loyal | 275,000 | 275,000 | $8.50 | $2,338 | 50% | 137,500 | $0.50 | $0.15 | $91,713 |
| Brand Preferred | 235,000 | 235,000 | $8.50 | $1,998 | 30% | 70,500 | $0.50 | $0.15 | $47,823 |
| Brand Switchers | 500,000 | 500,000 | $8.50 | $4,250 | 40% | 200,000 | $0.50 | $0.15 | $134,250 |
| Brand Loyal to Competitor | 90,000 | 90,000 | $8.50 | $765 | 0% | - | $0.50 | $0.15 | $765 |
| Total Population | 1,500,000 | 1,400,000 |  | $11,900 |  |  |  |  | $277,100 |
|  |  |  |  |  |  |  |  |  |  |
|  | Percent Incremental Purchases | Incremental Purchases | Cost per Incremental Purchase |  |  |  |  |  |  |
| Non Sauce Users | 0% | - | NA |  |  |  | Summary |  |  |
| Sauce Users |  |  |  |  | Cost |  |  |  |  |
| Brand Loyal | 0% | - | NA |  | Media |  | $11,900 |  |  |
| Brand Preferred | 25% | 17,625 | $0.00 |  | Redemption |  | $204,000 |  |  |
| Brand Switchers | 60% | 120,000 | $0.76 |  | Admin. |  | $61,200 |  |  |
| Brand Loyal to Competitor | 0% | - | NA |  | Value |  |  |  |  |
| Total |  | 137,625 | $2.01 |  | Incremental Margin |  | $240,844 |  |  |
|  |  |  |  |  | Cost |  | $277,100 |  |  |
|  |  |  |  |  | Net Value |  | ($36,256) |  |  |

FIG. 3B

| | Population | Circulation | Media Cost/M | Total Media Cost | Redemption Rate | Redeemers | Discount | Handling | Total Cost |
|---|---|---|---|---|---|---|---|---|---|
| Non Sauce Users | 400,000 | - | $15.00 | $0 | 0% | - | $0.50 | $0.15 | $0 |
| Sauce Users | 1,100,000 | | | | | - | | | |
| Brand Loyal | 275,000 | 275,000 | $15.00 | $4,125 | 15% | 41,250 | $0.25 | $0.15 | $20,625 |
| Brand Preferred | 235,000 | 235,000 | $15.00 | $3,525 | 40% | 94,000 | $0.75 | $0.15 | $88,125 |
| Brand Switchers | 500,000 | 500,000 | $15.00 | $7,500 | 40% | 200,000 | $0.50 | $0.15 | $137,500 |
| Brand Loyal to Competitor | 90,000 | 90,000 | $15.00 | $1,350 | 5% | 4,500 | $1.50 | $0.15 | $8,775 |
| Total Population | 1,500,000 | 1,100,000 | | $16,500 | | | | | $255,025 |
| | | | | | | | | | |
| | Percent Incremental Purchases | Incremental Purchases | Cost per Incremental Purchase | | | | Summary | | |
| Non Sauce Users | 0% | - | NA | | | | | | |
| Sauce Users | | | | | Cost | | | | |
| Brand Loyal | 0% | - | NA | | Media | | $16,500 | | |
| Brand Preferred | 25% | 23,500 | $0.00 | | Redemption | | $187,563 | | |
| Brand Switchers | 60% | 120,000 | $0.17 | | Admin. | | $50,963 | | |
| Brand Loyal to Competitor | 100% | 4,500 | $19.58 | | Value | | | | |
| Total | | 148,000 | $1.72 | | Incremental Margin | | $259,000 | | |
| | | | | | Cost | | $255,025 | | |
| | | | | | Net Value | | $3,975 | | |

FIG. 3C

| | Population | Circulation | Media Cost/M | Total Media Cost | Rate of Redemption | Number of Redemptions | Discount | Handling | Total Cost |
|---|---|---|---|---|---|---|---|---|---|
| Non Sauce Users | 400,000 | - | $15.00 | $0 | 0% | - | $0.50 | $0.15 | $0 |
| Sauce Users | 1,100,000 | | | | | - | | | |
| Brand Loyal | 275,000 | - | $15.00 | $0 | 15% | - | $0.25 | $0.15 | $0 |
| Brand Preferred Price Sensitive | 175,000 | 175,000 | $15.00 | $2,625 | 45% | 78,750 | $0.70 | $0.15 | $69,563 |
| Brand Preferred Not Price Sensitive | 60,000 | 60,000 | $15.00 | $900 | 20% | 12,000 | $0.25 | $0.15 | $5,700 |
| Brand Switchers Price Sensitive | 375,000 | 375,000 | $15.00 | $5,625 | 50% | 187,500 | $0.65 | $0.15 | $155,625 |
| Brand Switchers Not Price Sensitive | 125,000 | 125,000 | $15.00 | $1,875 | 20% | 25,000 | $0.25 | $0.15 | $11,875 |
| Brand Loyal to Competitor | 90,000 | 90,000 | $15.00 | $1,350 | 5% | 4,500 | $1.50 | $0.15 | $8,775 |
| Total Population | 1,500,000 | 825,000 | | $12,375 | | | | | $251,538 |
| | Percent Incremental Purchases | Incremental Purchases | Cost per Incremental Purchase | | | | | | |
| Non Sauce Users | 0% | - | NA | | | | | | |
| Sauce Users | | | | | Cost | | | | |
| Brand Loyal | 0% | - | NA | | Media | | $12,375 | | |
| Brand Preferred Price Sensitive | 25% | 19,688 | $3.53 | | Redemption | | $193,000 | | |
| Brand Preferred Not Price Sensitive | 35% | 4,200 | $1.36 | | Admin. | | $46,163 | | |
| Brand Switchers Price Sensitive | 70% | 131,250 | $1.19 | | Value | | | | |
| Brand Switchers Not Price Sensitive | 70% | 17,500 | $0.68 | | Incremental Margin | | $275,538 | | |
| Brand Loyal to Competitor | 100% | 4,500 | $1.95 | | Cost | | $251,538 | | |
| Total | | 157,450 | $1.60 | | Net Value | | $24,000 | | |

Summary (inset): Cost — Media $12,375; Redemption $193,000; Admin. $46,163. Value — Incremental Margin $275,538; Cost $251,538; Net Value $24,000.

FIG. 3D

ELECTRONIC OFFER MANAGEMENT SYSTEM AND METHOD THEREOF

BACKGROUND OF THE INVENTION

The present invention relates generally to an electronic offer management system and method thereof, and more particularly to a system that enables the electronic management of offers distributed by a plurality of different offer distributors to customers and the dynamic profiling of such customers so that improved offer targeting can be achieved.

Today, about twenty percent (20%) of all sales in grocery retail are covered by some promotion or offer. These offers are found in a variety of forms including temporary price reductions, in-store displays, manufacturer-sponsored coupon offers, advertisements, and frequent shopper (i.e., loyalty) discounts. Traditionally, such offers have been distributed to customers via "physical" media (i.e. direct mailers, printers, displays at the register, Sunday coupon inserts, magazines, etc.). Given the manual nature of such a system of distribution, however, customer-specific offers based on a variety of factors, such as demographics, past purchasing behavior, and price sensitivity are impractical. This in turn has a substantial impact on the effectiveness and cost of providing offers through such a system. For retailers having numerous competing product lines, such as supermarkets, this offer targeting capability is critical. Moreover, clearing and settlement of offers distributed in such a manner is technically infeasible with respect to time, labor and thus, cost intensive.

With the advent of the Internet as a new ecommerce tool, offers are now also being distributed "virtually" to customers. For example, companies such as Cool Savings, PlanetU and ValuPage are operating websites from which customers can obtain coupons redeemable at various retail stores and supermarkets, as well as at stores having an online presence. Traditional retailers are also beginning to distribute offers online. For example, Schnucks supermarket provides it's weekly advertisements, as well as coupons online. Offer targeting across a plurality of different offer distributors or based on "non-customer" data, such as price, is not allowed. Moreover, the clearance and settlement of such offers are still performed largely through a manual process and in a decentralized manner. As a result, fraudulently fabricated offers cannot be accurately tracked and thus, prevented.

Finally, under current methods of offer distribution, retailers must customize their point-of-sale (POS) system according to each offer distributor's technical design structure. In addition, the entire offer transaction from creation through redemption, clearance and settlement is not centralized, thereby increasing the complexity of the interfaces needed between the parties to the entire transaction. Moreover, data relevant to the transaction and necessary for sophisticated levels of targeting cannot be obtained from a single source, thereby decreasing its accessibility, accuracy and completeness. Given that the primary purpose of providing such offers is to drive up the number of new sales, the inability to manage electronic offers in a centralized manner and to dynamically profile customers and target offers increases the overall costs and effectiveness of the offers.

Accordingly, there is a need for an electronic offer management system in which offers can be distributed by a plurality of different offer distributors for automatic routing to a store's point of sale system, and in which such offers can be automatically cleared and settled once redeemed, such that an electronic audit of the entire offer transaction, and dynamic profiling of customers for improved offer targeting can be achieved.

SUMMARY OF THE INVENTION

An electronic offer management system for offer transactions is disclosed. The system comprises receiving means for receiving information related to a plurality of offers distributed by a plurality of different offer distributors to customers for redemption at a plurality of stores, routing means for automatically routing the information related to each offer to a point-of-sale system of each store in which the offer can be redeemed, and clearing means for automatically clearing the offers redeemed by the customers at the stores. The plurality of offer distributors comprises at least one of an internet offer distributor, a retailer offer distributor, a kiosk offer distributor, a direct mail offer distributor, and an email offer distributor.

The clearing means comprises means for receiving redemption information from the stores, and means for comparing the redemption information to the offer information whereby each offer redeemed by the customers can be validated. The system further comprises settlement means for automatically reconciling financial obligations associated with each offer cleared by the clearing means, whereby a single, electronic audit of each offer transaction can be achieved.

The system further comprises activation means for selectively activating and deactivating each offer. The system also further comprises profiling means for dynamically profiling the customers so that the offers can be targeted to specific customers, and offer consolidation means for consolidating the offers available through the system for presentation to the customer at a plurality of levels. The profiling means preferably comprises at least one of a static profile, a persistent profile and a dynamic profile. The plurality of levels comprises at least one of an offer distributor level and a store level. Each offer corresponds to a reward, and the system further comprises reward deferral means for deferring issuance of the reward to a third party. The offer information comprises at least one condition, which is at least one of an item purchase condition, a department purchase condition, a total purchase condition, a time of day condition and a day of the week condition.

A method of electronic management of offer transactions is also disclosed. The method comprises receiving information related to a plurality of offers distributed by a plurality of different offer distributors to customers for redemption at a plurality of stores, automatically routing the information of each offer to a point-of-sale system of each store in which the offer can be redeemed, and automatically clearing the offers redeemed by the customers at the stores.

The method further comprises the step of automatically reconciling financial obligations associated with each cleared offer whereby a single, electronic audit of each offer transaction can be achieved. The method also further comprises the step of receiving redemption information from the stores, and comparing the redemption information to the offer information whereby each offer redeemed by the customers can be validated. The method also preferably comprises the step of selectively activating each offer, and consolidating the offers for presentation to the customer at a plurality of levels, such as offer distributor level and a store level. The method also further comprises the step of dynamically profiling the customers so that the offers can be targeted to specific customers.

BRIEF DESCRIPTION OF THE DRAWINGS

FIG. 3A is a spreadsheet showing an example of a non-targeted offer.

FIG. 3B is a spreadsheet showing an example of a static profile-targeted offer generated through the system of FIG. 1.

FIG. 3C is a spreadsheet showing an example of a persistent profile-targeted offer generated through the system of FIG. 1.

FIG. 3D is a spreadsheet showing an example of a dynamic profile-targeted offer generated through the system of FIG. 1.

DETAILED DESCRIPTION OF THE PREFERRED EMBODIMENTS

Figure 1:
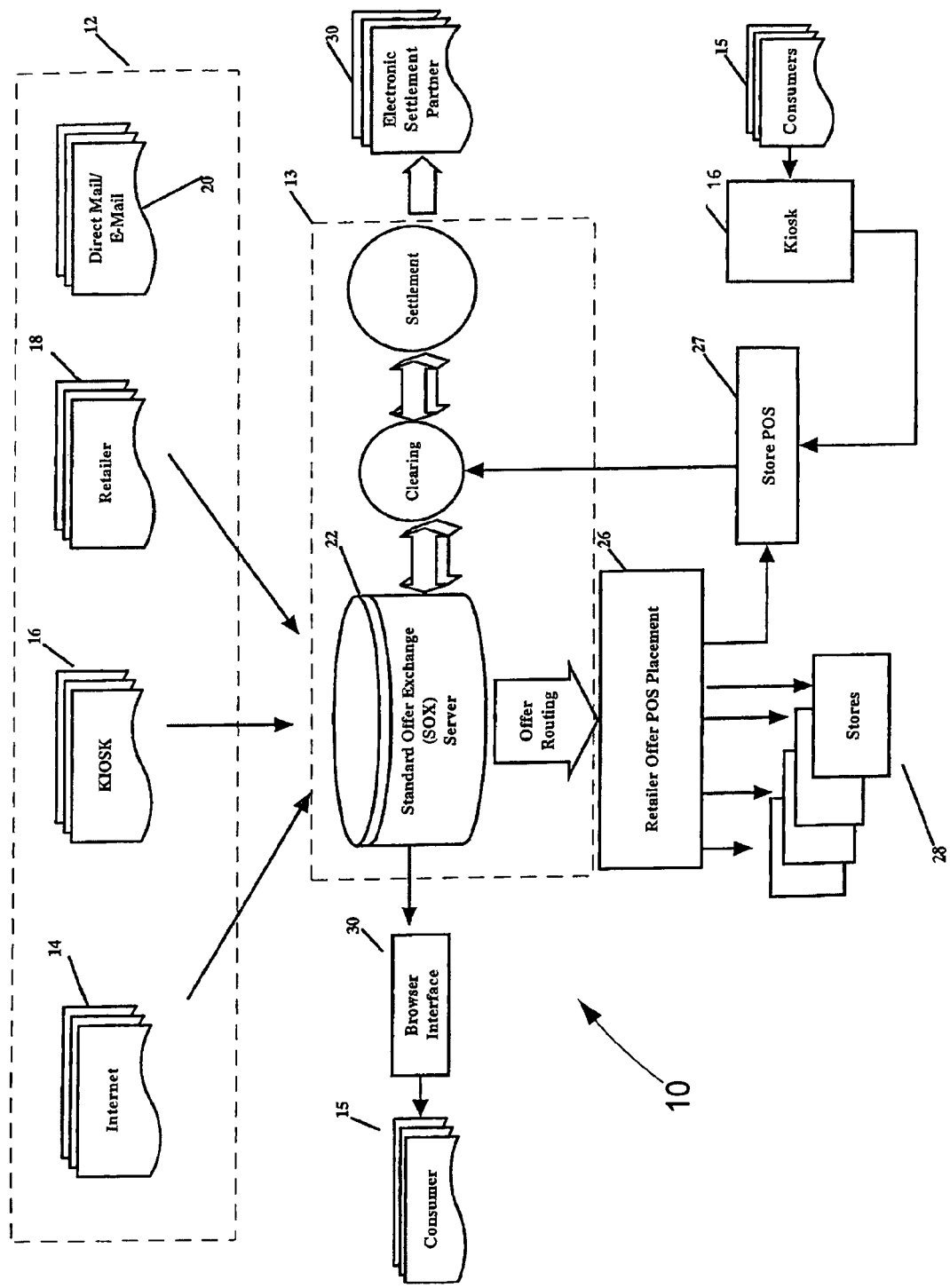
FIG. 1 illustrates the flow of information in an electronic offer management system in accordance with the present invention.

The present invention is directed to an electronic offer management system and method thereof. FIG. 1 illustrates the main components of the system represented as 10, as well as the flow of information there through. In summary, offers are distributed to customers by a plurality of different offer distributors 12. The details of the offers are communicated to an electronic clearing network 13 and routed to the appropriate store 28 for redemption by customers. Transaction log files containing point-of-sale transaction details are forwarded back to network 13 where a clearing process identifies what offers have been redeemed and validates them against the offers communicated to network 13. Settlement details are also prepared for processing by a settlement agent 30. For the purposes of discussion only, system 10 will be described with respect to offers written in extensive Markup language (XML) having a representative documentation convention for XML element and attribute tags as described below. It can be appreciated by one skilled in the art, however, that the offer may be defined using other languages or formats that allow for the functionality described herein, such as for example the Hypertext Markup language.

| Element/Attribute Tag | Description |
|---|---|
| /SOX | Element aggregate tag. |
| /SOX/@Version | Element attribute tag identified with a @. |
| /SOX/Offer/OfferMaintReq/OfferProperties | Shortened form for: /SOX/Offer/OfferMaintReq/OfferProperties/MemberOffer |
| . . /MemberOffer | |
| . . /RewardSet[]/ItemPurchase/ItemList/Item[] | Element list has [] appended (occurrence indicator). In the example . . /RewardSet[] is an aggregate element that must appear once or many times. In this example, the . . /Item[] element must appear once or many times within each instance of /RewardSet[]. |

Referring to FIG. 1, the process starts through the distribution of an offer to a customer by an offer distributor 12 that is available for redemption at one or more stores 28, which can be traditional brick-and-mortar stores, direct mail stores, online stores or any other type or form of store. In one embodiment, this is done in conjunction with a manufacturer (not shown) who is the sponsor of the offer and thus, bears the cost of it. Offers are distributed via a plurality of different offer distributors including but not limited to Internet offer distributors 14, in-store kiosk offer distributors 16, retailer offer distributors 18, and direct mail/email offer distributors 20. System 10 operates using five (5) XML document types, namely Offer, CustomerOffer, OfferAck, CustomerOfferAck and ErrorResponse.

The Offer document type defines the generic offer setup (i.e. offer properties, conditions, and rewards) and routing instructions. In a preferred embodiment, each Offer document is limited to information related to a single offer being distributed by a particular offer distributor 12. The maintenance actions supported by the Offer document type are to add, replace or delete an offer, and are identified in a tabular format as shown below.

| XML Element/Attribute Tag | Data Type | Max Len | Occur | Usage | Description |
|---|---|---|---|---|---|
| /SOX/Offer | Aggregate | 0 | Once | Required Always | Offer: The /SOX/Offer aggregate element may contain: One /SOX/Offer/OfferMaintReq aggregate element and one /SOX/Offer/Offer RouteReg aggregate element; OR One /SOX/Offer/OfferMaintReq aggregate element only; OR One /SOX/Offer/OfferRouteReq aggregate element only. |
| . . /@OfferID | String | 12 | Once | Required Always | Offer ID: Number is provided by offer distributor and must be unique for that distributor. |
| . . /OfferMaintReq | Aggregate | 0 | Once | Optional | Offer Maintenance Request: Encapsulates Offer maintenance request details for @OfferID above. |
| . . /OfferMaintReq/@Action | Enumerated String | 7 | Once | Required | Action: Offer maintenance action requested. Valid values: Add Replace Delete |

The CustomerOffer document type defines any customer-specific offer setup and routing instructions. The OfferAck document type represents the positive acknowledgement returned by the network 13 upon its successful processing of an Offer document type. Likewise, CustomerOfferAck document type represents the positive acknowledgement returned by the network 13 upon its successful processing of a CustomerOffer document type. Finally, ErrorResponse document type represents the negative acknowledgement returned by the network 13 upon encountering an error in the course of processing an Offer or CustomerOffer document type. These document types preferably adhere to the document type definition (DTD) as identified in Appendix 1.

There are three (3) main components to each offer, namely offer properties, conditions, and rewards. Offer properties are the data elements that serve to generally describe an offer, such as a description, valid date range, and the number of times a customer may receive the reward(s) associated with that offer. Each Offer document includes a header, a representative sample of which is identified in a tabular format below.

| XML Element/ Attribute Tag | Data Type | Max Len | Oc-cur | Usage | Description |
|---|---|---|---|---|---|
| /SOX | Aggregate | 0 | Once | Required Always | Document Root Element: Identifies this as a SOX XML document. |
| ../@Offer DistributorID | String | 6 | Once | Required Always | Offer Distributor ID: Assigned by the ECN. Value = 1–999999 |
| ../@Sender Doc UID | String | 12 | Once | Required Always | Sender's Document Unique ID: Sender's unique reference code for this document for audit trail purposes. |
| ../@Version | String | 3 | Once | Required Always | SOX Version of File: Version of SOX to which this document conforms. Value = 1.0 |
| ../@Ack Requested | Enumerated String | 7 | Once | Required Always | Acknowledgement Requested: Defines type of acknowledgement requested. Supported values: Normal Terse Verbose |
| ../@SOX Type | Enumerated String | 5 | Once | Required Always | Sox Type: Indicates type of SOX XML document. All SOX documents have this attribute with appropriate values. Value = Offer |

The header includes an @Offer DistributorID parameter that represents an identifier assigned by the network 13 for each offer distributor 12 of system 10. The @SenderDocUID parameter represents a unique reference code which identifies the XML document to its sender so he or she can later refer to it. This parameter is used for audit trail purposes. The @Version parameter represents the version of the specification to which the Offer document conforms. The @AckRequested parameter defines the type of acknowledgement requested for the Offer document (i.e., normal, terse, verbose). The @SOXType document identifies the type of XML document (in this case, "Offer").

A representative sample of the plurality of offer properties available through system 10 is identified in a tabular format as shown below.

| XML Element/ Attribute Tag | Data Type | Max Len | Oc-cur | Usage | Description |
|---|---|---|---|---|---|
| /SOX/ Offer/ Offer MaintReq/ OfferProperties | Aggregate | 0 | Once | Optional | Offer Properties: Contains Offer Properties for @OfferID above. This element is required when /SOX/Offer/@Action = "Add" or "Replace". It is not required when /SOX/Offer/@Action = "Delete". |
| ../MemberOffer | String | 3 | Once | Required | Member Offer: Is loyalty program membership required? Valid values: Yes No When membership is not a requirement, all customers are eligible to participate in the Offer. |
| ../StaffAllowed | String | 3 | Once | Required | Staff Allowed: Can staff participate in this offer? Valid values: Yes No |
| ../OfferType | String | 6 | Once | Required | Offer Type: Coupon type for monetary rewards. (For tax calculations.) Valid values: Vendor Store |
| ../OfferXactLimit | String | 2 | Once | Required | Offer Transaction Limit: Maximum number of times this offer may be used per transaction. Value = 0–9, or −1 (= unlimited). If value = 0, this offer is not active. |
| ../OfferCustLimit | String | 2 | Once | Required | Offer Customer Limit: Total number of times this offer may be used, across transactions. Value = 0–9, or −1 (= unlimited). |
| ../OfferStartDateTime | Aggregate | 0 | Once | Required | Offer Start Date Time: Date/time when the offer becomes active. Encapsulates the elements that define the timestamp. |
| ../OfferStartDateTime/Year | String | 4 | Once | Required | Offer Start Date Time: Year Format: CCYY |
| ../OfferStartDateTime/Month | String | 2 | Once | Required | Offer Start Date Time: Month Format: MM Value = 01–12 |
| ../OfferStartDateTime/Day | String | 2 | Once | Required | Offer Start Date Time: Day Format: DD Value = 01–31 |
| ../OfferStartDateTime/Hour | String | 2 | Once | Required | Offer Start Date Time: Hour Format: HH Value = 00–23 |
| ../OfferStartDateTime/Minute | String | 2 | Once | Required | Offer Start Date Time: Minute Format: MM Value = 00–59 |
| ../OfferEndDateTime | Aggregate | 0 | Once | Required | Offer End Date Time: Date/time after which the offer expires. Encapsulates the elements that define the timestamp. |

-continued

| XML Element/ Attribute Tag | Data Type | Max Len | Occur | Usage | Description |
|---|---|---|---|---|---|
| . . /Offer EndDate Time/Year | String | 4 | Once | Required | Offer End Date Time: Year Format: CCYY |
| . . /Offer EndDate Time/Month | String | 2 | Once | Required | Offer End Date Time: Month Format: MM Value = 01–12 |
| . . /Offer EndDate Time/Day | String | 2 | Once | Required | Offer End Date Time: Day Format: DD Value = 01–31 |
| . . /Offer EndDate Time/Hour | String | 2 | Once | Required | Offer End Date Time: Hour Format: HH Value = 00–23 |
| . . /Offer EndDate Time/Minute | String | 2 | Once | Required | Offer End Date Time: Minute Format: MM Value = 00–59 |
| . . /Offer Description | String | 40 | Once | Required | Offer Description: Text description of the promotion - printed on checkout receipt. Format on checkout receipt: 2 lines of 20 characters each. |
| . . /Offer Report Description | String | 40 | Once | Required | Offer Report Description: Text description of the offer for reporting purposes. |
| . . /Offer Sponsor Settlement ID | String | 9 | Once | Required | Offer Sponsor Settlement ID: Assigned by the ECN. Value = 1–999999999 |
| . . /Deferred Reward | String | 3 | Once | Required | Deferred Reward: Is reward to be received in a deferred manner (or directed to another party), or is it to be received at checkout. Valid values: "Yes" = Deferred receipt. "No" = Checkout receipt. |

MemberOffer is a field representing whether an offer is open to the public or requires membership to a frequent shopper, loyalty or similar-type program. StaffAllowed is a field representing the employees of the store to which the offer has been routed. OfferType is a field representing whether the offer is being offered by a vendor or a store. OfferXactLimit is a field representing the maximum number of times the offer may be used by a customer per transaction. OfferCustLimit is a field representing the maximum number of times the offer may be used by a customer across transactions. OfferStartDateTime is an aggregate field representing the date and time when the offer becomes active (broken down by year, month, day, hour and minute), while OfferEndDateTime is an aggregate field representing the date and time after which the offer may not be used (broken down by year, month, day, hour and minute). OfferDescription is a field representing a text description of the offer, which is preferably printed out on the customer's checkout receipt upon redemption. OfferReportDescription is a field representing a text description of the offer for reporting purposes, such as offer performance analysis. OfferSponsorSettlementID is a field representing the unique number used to identify the sponsor of each offer. DeferredReward is a field indicating whether a reward associated with an offer is to be received in a deferred manner or directed to another party. One skilled in the art can appreciate that the number and type of offer properties may vary depending on the application.

A representative sample of the plurality of conditions required for redeeming an offer through system 10 is identified in tabular format as shown below.

| XML Element/ Attribute Tag | Data Type | Max Len | Occur | Usage | Description |
|---|---|---|---|---|---|
| /SOX/ Offer/Offer MaintReq/Offer Conditions | Aggregate | 0 | Once | Optional | Offer Conditions: Encapsulates the Conditions applicable to @OfferID. This element is required when . . /Offer/@Action = "Add" or "Replace". It is not required when . . /Offer/@Action = "Delete". |
| /@ConditionSet Count | String | 1 | Once | Required | Condition Set Count: Number of Condition Set instances in this document. Value = 1–7 |
| . . /ConditionSet[] | Aggregate List | 0 | One or Many | Required | Condition Set: Encapsulates the details of a single Condition Set. This element must contain only one of the following available Condition Set type elements: ItemPurchase DeptPurchase TotalPurchase TimeOfDay DayOfWeek |
| . . /ConditionSet[] /@Condition SetID | Enumerated String | 1 | Once | Required | Condition Set ID: Value = 0–7 Value must be mutually exclusive with other @ConditionSetID values and /SOX/Offer/Offer MaintReg/Offer Rewards/RewardSet[]/ @RewardSetID values. |
| . . /ConditionSet[] /Item Purchase | Aggregate | 0 | Once | Optional | Item Purchase: Element which encapsulates the details of the ItemPurchase Condition Set type. |
| . . /ConditionSet[] /Item Purchase/ @Measure | Enumerated String | 8 | Once | Required | Measure: Defines the basis on which this Condition Set type is measured. Valid values: Quantity Weight Amount Where "Amount" is a monetary amount. If "Weight" is specified, the Offer Distributor is responsible for ensuring that Items in ItemList are sold by weight. |

-continued

| XML Element/ Attribute Tag | Data Type | Max Len | Oc-cur | Us-age | Description |
|---|---|---|---|---|---|
| . . /ConditionSet[]/ItemPurchase/ItemList | Aggregate | 0 | Once | Required | Item List: Encapsulates items that may be purchased interchangeably to meet this Condition. |
| . . /ConditionSet[]/ItemPurchase/ItemList/@ItemCount | String | 4 | Once | Required | Item Count: The number of . .Item List/Item[] entries to follow. Value = 1–9999 |
| . . /ConditionSet[]/ItemPurchase/ItemList/Item[] | String List | 12 | One or Many | Required | Item: UPC/EAN Code of eligible item without the check digit. All 12 digits must be specified even if leading zero's are needed. Compressed UPC is not permitted. |
| . . /ConditionSet[]/ItemPurchase/CondChkFlg | String | 1 | Once | Required | Condition Check Flag: Valid values: "0" = Once conditions are met, rewards issued for all qualifying items thereafter. "1" = Conditions must be met each time to receive rewards. |
| . . /ConditionSet[]/ItemPurchase/MeasureValue | String | 10 | Once | Required | Measure Value: Metric of . . /ItemPurchase/@Measure required to be purchased. Value = 1–2147483647 If . . /ItemPurchase/@Measure = Quantity, Value is in units. = Weight, Value is in hundredths of pounds. = Amount, Value is in cents. |
| . . /ConditionSet[]/DeptPurchase | Aggregate | 0 | Once | Optional | Department Purchase: Element which encapsulates the details of the DeptPurchase Condition Set type. The Offer Distributor is responsible for the correct identification of departments. It is recommended that only the store operator uses this Condition Set type. |
| . . /ConditionSet[]/DeptPurchase/DeptList | Aggregate | 0 | Once | Required | Department List: Element encapsulating the store departments from which items may be purchased interchangeably to meet this Condition. |
| . . /ConditionSet[]/DeptPurchase/DeptList/@DeptCount | String | 4 | Once | Required | Department Count: The number of . .Dept List/Dept[] entries to follow. Value = 1–9999 |
| . . /ConditionSet[]/DeptPurchase/DeptList/Dept[] | String List | 4 | One or Many | Required | Department: Store department from which items must be purchased. Value = 1–9999 |
| . . /ConditionSet[]/DeptPurchase/CondChkFlg | String | 1 | Once | Required | Condition Check Flag: Valid values: "0" = Once conditions are met, rewards issued for all qualifying items thereafter. "1" = Conditions must be met each time to receive rewards. |
| . . /ConditionSet[]/DeptPurchase/Amount | String | 10 | Once | Required | Amount: The monetary amount required to be purchased expressed in cents. Value = 1–2147483647 |
| . . /ConditionSet[]/TotalPurchase/ | Aggregate | 0 | Once | Optional | Total Purchase: Element which encapsulates the details of the TotalPurchase Condition Set type. |
| . . /ConditionSet[]/TotalPurchase/@Includes | Enumerated String | 12 | Once | Required | Includes: Defines whether "All" items or only those that are "Discountable" are included in the total of purchases to be evaluated. Valid values: All Discountable |
| . . /ConditionSet[]/TotalPurchase/CondChkFlag | String | 1 | Once | Required | Condition Check Flag: Valid values: "0" = Once conditions are met, rewards issued for all qualifying items thereafter. "1" = Conditions must be met each time to receive rewards. |
| . . /ConditionSet[]/TotalPurchase/Amount | String | 10 | Once | Required | Amount: The total monetary amount required to be purchased expressed in cents. Value = 1–2147483647 |
| . . /ConditionSet[]/TimeOfDay | Aggregate | 0 | Once | Optional | Time Of Day: Element which encapsulates the details of the TimeOfDay Condition Set type. |
| . . /ConditionSet[]/TimeOfDay/StartTime | Aggregate | 0 | Once | Required | Start Time: Encapsulates the details of StartTime. |
| . . /ConditionSet[]/TimeOfDay/StartTime/Hour | String | 2 | Once | Required | Hour: Format: HH Value: 00–23 |
| . . /ConditionSet[]/TimeOfDay/StartTime/Minute | String | 2 | Once | Required | Minute: Format: MM Value: 00–59 |
| . . /ConditionSet[]/TimeOfDay/EndTime | Aggregate | 0 | Once | Required | End Time: Encapsulates the details of EndTime. |

-continued

| XML Element/ Attribute Tag | Data Type | Max Len | Occur | Usage | Description |
|---|---|---|---|---|---|
| .../ConditionSet[]/TimeOfDay/EndTime/Hour | String | 2 | Once | Required | Hour: Format: HH Value: 00–23 |
| .../ConditionSet[]/TimeOfDay/EndTime/Minute | String | 2 | Once | Required | Minute: Format: MM Value: 00–59 |
| .../ConditionSet[]/DayOfWeek | Aggregate | 0 | Once | Optional | Day Of Week: Element which encapsulates the details of the DayOfWeek Condition Set type. |
| .../ConditionSet[]/DayOfWeek/Sunday | String | 3 | Once | Required | Sunday: Indicates whether the Offer is available on Sundays. Note that at least one of the days should have a "Yes" value. Valid values: Yes No |
| .../ConditionSet[]/DayOfWeek/Monday | String | 3 | Once | Required | Monday: Valid values: Yes No |
| .../ConditionSet[]/DayOfWeek/Tuesday | String | 3 | Once | Required | Tuesday: Valid values: Yes No |
| .../ConditionSet[]/DayOfWeek/Wednesday | String | 3 | Once | Required | Wednesday: Valid values: Yes No |
| .../ConditionSet[]/DayOfWeek/Thursday | String | 3 | Once | Required | Thursday: Valid values: Yes No |
| .../ConditionSet[]/DayOfWeek/Friday | String | 3 | Once | Required | Friday: Valid values: Yes No |
| .../ConditionSet[]/DayOfWeek/Saturday | String | 3 | Once | Required | Saturday: Valid values: Yes No |

Conditions are the rules or requirements for receiving the reward(s) associated with a particular offer. The conditions associated with an offer are defined by a plurality of condition sets. In one embodiment, there are five (5) types of condition sets, namely an item purchase condition set, a department purchase condition set, a total purchase condition set, a time of day condition set and a day of week condition set. The item purchase condition set identifies the item or items that must be purchased, which can be broken down by quantity, weight and/or amount. The department purchase condition set identifies the department or departments from which each item must be purchased. The total purchase condition set identifies the amount of total purchases required. The time of day condition set identifies a time period during which rewards may be received. The day of week condition set identifies the day(s) of the week on which the rewards may be received. Each condition set is programmed such that once conditions are met, rewards are issued for all qualifying items. While only one condition set type is allowed for each condition set, more than one condition set may contain the same condition set type. One skilled in the art can appreciate, however, that the number and type of condition sets may vary depending on the application. In one embodiment, seven (7) condition sets may be defined. When multiple condition sets are specified, all of the conditions in each set must be met in order to receive the corresponding rewards.

A representative sample of the plurality of reward parameters available through system 10 is identified in tabular format below.

| XML Element/ Attribute Tag | Data Type | Max Len | Occur | Usage | Description |
|---|---|---|---|---|---|
| /SOX/Offer/OfferMaintReq/OfferRewards | Aggregate | 0 | Once | Optional | Offer Rewards: Encapsulates the Rewards applicable to @OfferID. This element is required when /SOX/Offer/@Action = "Add" or "Replace". It is not required when /SOX/Offer/@Action = "Delete". |
| .../@RewardSetCount | String | 1 | Once | Required | Reward Set Count: Number of Reward Set instances in this document. Value = 1–7 |
| .../RewardSet[] | Aggregate List | 0 | One or Many | Required | Reward Set: Encapsulates the details of a single Reward Set. This element must contain only one of the following available Reward Set type elements: ItemDiscount DeptDiscount TotalDiscount Free Item ReplacementPrice-Method1 |
| .../RewardSet[]/@RewardSetID | Enumerated String | 1 | Once | Required | Reward Set ID: Value = 0–7 Value must be mutually exclusive with other @RewardSetID values and /SOX/Offer/OfferMaintReq/OfferConditions/ConditionSet[]/@ConditionSetID values. |
| .../RewardSet[]/ItemDiscount | Aggregate | 0 | Once | Optional | Item Discount: Element which encapsulates the details of the ItemDiscount Reward Set type. |
| .../RewardSet[]/ItemDiscount/@Basis | Enumerated String | 7 | Once | Required | Basis: Defines the basis on which Rewards will be given: Valid values: "Percent" = |

-continued

| XML Element/ Attribute Tag | Data Type | Max Len | Oc- cur | Us- age | Description |
|---|---|---|---|---|---|
| . . /Reward Set[]/Item Discount/ ItemList | Aggregate | 0 | Once | Re- quired | Percentage off. "Amount" = Amount off. Item List: Element encapsulating the items that may receive this Reward. |
| . . /Reward Set[]/Item Discount/ ItemList/ @Item Count | String | 4 | Once | Re- quired | Item Count: The number of . .ItemList/Item[] entries to follow. Value = 1–9999 |
| . . /Reward Set[]/Item Discount/ ItemList/ Item[] | String List | 12 | One or Many | Re- quired | Item: UPC/EAN Code of eligible item without the check digit. All 12 digits must be specified even if leading zero's are needed. Compressed UPC is not permitted. |
| . . /Reward Set[]/Item Discount/ Reward Limit | String | 2 | Once | Re- quired | Reward Limit: Maximum number of Rewards which can be issued each time the Conditions of the Offer are met. Value = 1–9, or −1 (= unlimited). |
| . . /Reward Set[]/Item Discount/ Basis Value | String | 10 | Once | Re- quired | Basis Value: Metric of . . /Item Discount/@Basis to be applied. If . . /Item Discount/@Basis = Percent, then the value is the percentage discount in whole numbers. Value = 1–99 If . . /ItemDiscount/ @Basis = Amount, then the value is the discount amount in cents. Value = 1–2147483647 Note that the price of an item will never be reduced below zero. |
| . . /Reward Set[]/Dept Discount | Aggregate | 0 | Once | Op- tional | Department Discount: Element which encap- sulates the details of the DeptDiscount Reward Set type. The Offer Distributor is responsible for the correct identification of departments. It is recommended that only the store operator uses this Reward Set type. |
| . . /Reward Set[]/Dept Discount/ @Basis | Enumerated String | 7 | Once | Re- quired | Basis: Defines the basis on which Rewards will be given: Valid values: "Percent" = Percentage off. "Amount" = Amount off. |
| . . /Reward Set[]/Dept Discount/ DeptList | Aggregate | 0 | Once | Re- quired | Department List: Element encapsulating the store departments whose items are eligible to receive this Reward. |
| . . /Reward Set[]/Dept Discount/ DeptList/ @Dept Count | String | 4 | Once | Re- quired | Department Count: The number of . .DeptList/Dept[] entries to follow. Value = 1–9999 |
| . . /Reward Set[]/Dept Discount/ DeptList/ Dept[] | String List | 4 | One or Many | Re- quired | Department: Store department whose items are eligible to receive this Reward. Value = 1–9999 |
| . . /Reward Set[]/Dept Discount/ Reward Limit | String | 2 | Once | Re- quired | Reward Limit: Maximum number of Rewards which can be issued each time the Conditions of the Offer are met. Value = 1–9, or −1 (= unlimited). |
| . . /Reward Set[]/Dept Discount/ Basis Value | String | 10 | Once | Re- quired | Basis Value: Metric of . . /DeptDiscount/ @Basis to be applied. If . . /DeptDiscount/ @Basis = Percent, then the value is the percentage discount in whole numbers. Value = 1–99 If . . /DeptDiscount/ @Basis = Amount, then the value is the discount amount in cents. Value = 1–2147483647 Note that the total value of purchases of items in eligible departments will never be reduced below zero. |
| . . /Reward Set[]/Total Discount | Aggregate | 0 | Once | Op- tional | Total Discount: Element which encap- sulates the details of the TotalDiscount Reward Set type. |
| . . /Reward Set[]/Total Discount/ @Basis | Enumerated String | 7 | Once | Re- quired | Basis: Defines the basis on which Rewards will be given: Valid values: "Percent" = Percentage off. "Amount" = Amount off. |
| . . /Reward Set[]/Total Discount/ Reward Limit | String | 2 | Once | Re- quired | Reward Limit: Maximum number of Rewards which can be issued each time the Conditions of the Offer are met. Value = 1–9, or −1 (= unlimited). |
| . . /Reward Set[]/Total Discount/ Basis Value | String | 10 | Once | Re- quired | Basis Value: Metric of . . /TotalDiscount/ @Basis to be applied. If . . /TotalDiscount/ @Basis = Percent, then the value is the |

| XML Element/ Attribute Tag | Data Type | Max Len | Oc-cur | Us-age | Description |
|---|---|---|---|---|---|
| | | | | | percentage discount in whole numbers. Value = 1–99 If . . /TotalDiscount/ @Basis = Amount, then the value is the discount amount in cents. Value = 1–2147483647 Note that the total value of purchases will never be reduced below zero. |
| . . /Reward Set[]/ FreeItem | Aggregate | 0 | Once | Optional | Free Item: Element which encapsulates the details of the FreeItem Reward Set type. |
| . . /Reward Set[] / FreeItem/ ItemList | Aggregate | 0 | Once | Required | Item List: Element encapsulating the items that may receive this Reward. |
| . . /Reward Set[]/Free Item/Item List/@ ItemCount | String | 4 | Once | Required | Item Count: The number of . .ItemList/Item[] entries to follow. Value = 1–9999 |
| . . /Reward Set[]/ FreeItem/ ItemList/ Item[] | String List | 12 | One or Many | Required | Item: UPC/EAN Code of eligible item without the check digit. All 12 digits must be specified even if leading zero's are needed. Compressed UPC is not permitted. |
| . . /Reward Set[]/ FreeItem/ Reward Limit | String | 2 | Once | Required | Reward Limit: Maximum number of Rewards which can be issued each time the Conditions of the Offer are met. Value = 1–9, or −1 (= unlimited). |
| . . /Reward Set[]/ ReplacementPrice Method1 | Aggregate | 0 | Once | Optional | Replacement Price Method 1: Element which encapsulates the details of the ReplacementPrice-Method1 Reward Set type. The replacement price to be applied follows IBM 4690 Supermarket Application pricing method 1 logic. Pricing methods 0, 2, 3, and 4 may be supported in future versions of the system, if required. This Reward Set type may not be used for weighed or NSC 02 items. |
| . . /Reward Set[]/Replacement Price Method1/ ItemList | Aggregate | 0 | Once | Required | Item List: Element encapsulating the items that may receive this Reward. |
| . . /Reward Set[]/Replacement Price Method1/ ItemList/ @Item Count | String | 4 | Once | Required | Item Count: The number of . .ItemList/Item[] entries to follow. Value = 1–9999 |
| . . /Reward Set[]/Replacement Price Method1/ ItemList/ Item[] | String List | 12 | One or Many | Required | Item: UPC/EAN Code of eligible item without the check digit. All 12 digits must be specified even if leading zero's are needed. Compressed UPC is not permitted. |
| . . /Reward Set[]/Replacement Price Method1/ DealPrice | String | 8 | Once | Required | Deal Price: Total price, in cents, of DealQuantity units. Value = 1–99999999 |
| . . /Reward Set[]/Replacement Price Method1/ Deal Quantity | String | 2 | Once | Required | Deal Quantity: Number of units received for DealPrice. Value = 1–99 |
| . . /Reward Set[]/Replacement Price Method1/ Reward Limit | String | 2 | Once | Required | Reward Limit: Maximum number of Rewards which can be issued each time the Conditions of the Offer are met. Value = 1–9, or −1 (= unlimited). |

Rewards are the benefits received by the customers when the conditions are met. The reward(s) associated with an offer are defined by a plurality of rewards sets. In one embodiment, there are five (5) reward set types, namely the item discount reward, the department discount reward, the total discount reward, the free item reward and the replacement price reward. One skilled in the art can appreciate, however, that the number and type of rewards may vary depending on the application. For example, rewards can be deferred to a third party, such as deposits directly into a mutual fund or a child's college fund.

The item discount reward is applied to the price of a specific item or item(s). The department discount reward is applied to the price of items in a certain department or departments. The total discount reward is applied to the total price of a customer's total purchases. The free item reward is applied to reduce the price of a specific item or items to zero. The replacement price reward is applied to replace an existing price for a specific item or items. While only one reward set type is allowed for each reward set, more than one reward set may contain the same reward set type. When multiple reward sets are specified, all possible rewards are given if the corresponding conditions are met.

Once the offers have been created, they are routed to the appropriate store or stores in which they are valid for redemption. A preferred format for offer store routing is provided below.

| XML Element/ Attribute Tag | Data Type | Max Len | Occur | Usage | Description |
|---|---|---|---|---|---|
| /SOX/ Offer/ OfferRouteReg | Aggregate | 0 | Once | Optional | Offer Route Request: Encapsulates all Offer store routing requests. |
| . . /StoreList[] | Aggregate List | 0 | One or Many | Required | Store List: Encapsulates details of all stores for which the same @Action is required for this @OfferID. |
| . . /StoreList[]/ @Action | Enumerated String | 7 | Once | Required | Action: Defines maintenance operation to be performed for this @Offer for this StoreList[]. Valid values: Add Replace Delete |
| . . /StoreList[]/ @StoreCount | String | 10 | Once | Required | Store Count: The number of . . /StoreList/Store[] entries to follow. Value = 1–2147483647 |
| . . /StoreList[]/ Store[] | Aggregate List | 0 | One or Many | Required | Store: Encapsulates the details of one store. |
| . . /StoreList[]/ Store[]/ StoreID | String | 10 | Once | Required | Store ID: Assigned by ECN. Unique Store Identifier. Valid value: 1–2147483647 |
| . . /StoreList[]/ Store[]/ ServicePriority | String | 2 | Once | Required | Service Priority: Indicates maximum processing delay for requested routing service. Supported values for the Pilot: "ON" = Overnight Beyond Pilot: "RT" = Real-time "15" = 15 Minutes "HR" = 1 Hour |

The OfferRouteReq parameter encapsulates all offer store routing requests. The Storelist parameter encapsulates the details of all stores for which the same maintenance action is required for a particular offer. In particular, the @Action parameter defines the particular maintenance action to be performed for the list of stores identified by the Storelist parameter. The Storecount parameter identifies the number of stores to which to apply said action. The Store parameter encapsulates the details of one store, namely the identification value assigned to the store by network 13. The ServicePriority parameter identifies the maximum processing delay for the requested routing service (i.e., overnight, real-time, or set-time).

In a preferred embodiment, customer-specific variations can be introduced with respect to an offer through the CustomerOffer document type, which has the same header format as that for the Offer document type, with the value of the @SOXType parameter being "CustomerOffer." A customer offer contains replacement values for some of the offer properties and rewards that are "overlaid" on top of the "generic" offer values when a customer identifies himself or herself at the time of purchase, such as through a loyalty card. A preferred format for the maintenance, the offer properties, rewards and offer routing for the Customer Offer document type are similar to that for an Offer document type and are identified in tabular format below, respectively.

Customer Offer Maintenance Request

| XML Element/ Attribute Tag | Data Type | Max Len | Occur | Usage | Description |
|---|---|---|---|---|---|
| /SOX/ CustomerOffer[] | Aggregate | 0 | One or Many | Required Always | Customer Offer: The /SOX/Customer Offer[] aggregate element may contain: One /SOX/Customer Offer[]/CustOfferMaintReg aggregate element and one /SOX /CustomerOffer[]/ CustOfferRouteReq aggregate element; OR One /SOX/Customer Offer[]/ CustOfferMaintReq aggregate element only; OR One /SOX/Customer Offer[]/ CustOfferRouteReq aggregate element only. |
| . . /@OfferID | String | 12 | Once | Required Always | Offer ID: Number is provided by offer distributor and must be unique for that distributor. Value = 1–999999999999 |
| . . /@MerchantID | String | 10 | Once | Required Always | Merchant ID: Assigned by ECN. Identifies the issuing organization for the Customer's loyalty card. Value: 1–2147483647 |
| . . /@CustomerID | String | 18 | Once | Required Always | Customer ID: Normally, the Customer's loyalty card number for the merchant represented by @MerchantID. |
| . . /CustOfferMaintReq | Aggregate | 0 | Once | Optional | Customer Offer Maintenance Request: Encapsulates CustomerOffer maintenance request details for @OfferID and @MerchantID/ @CustomerID above. |
| . . /CustOfferMaintReq/ @Action | Enumerated String | 8 | Once | Required | Action: CustomerOffer maintenance action requested. Valid values: Add Replace Delete Activate |

Customer Offer Properties

| XML Element/<br>Attribute Tag | Data Type | Max Len | Occur | Usage | Description |
|---|---|---|---|---|---|
| /SOX/CustomerOffer[]<br>/CustOfferMaintReq/<br>CustOfferProperties | Aggregate | 0 | | Optional | CustomerOffer Properties:<br>Contains CustomerOffer Properties for @OfferID for @MerchantID/@CustomerID above.<br>This element is required when /SOX/CustomerOffer[]/@Action = "Add" or "Replace" or "Activate".<br>It is not required when /SOX/CustomerOffer[]/@Action = "Delete". |
| . . /CustOfferXactLimit | String | 2 | Once | Required | Customer Offer Transaction Limit:<br>Maximum number of times this offer may be used per transaction.<br>Value = 0–9, or −1 (= unlimited).<br>If value = 0, this CustomerOffer is not active. |
| . . /CustOfferCustLimit | String | 2 | Once | Required | Customer Offer Customer Limit:<br>Total number of times this offer may be used, across transactions.<br>Value = 0–9, or −1 (= unlimited). |

Customer Offer Rewards

| XML Element/<br>Attribute Tag | Data Type | Max Len | Occur | Usage | Description |
|---|---|---|---|---|---|
| /SOX/Customer<br>Offer[]/CustOffer<br>MaintReq/<br>CustOfferRewards | Aggregate | 0 | Once | Optional | CustomerOffer Rewards:<br>Contains CustomerOffer Rewards for @OfferID for @MerchantID/@CustomerID above.<br>This element is required when /SOX/CustomerOffert[]/@Action = "Add" or "Replace".<br>It is not required when /SOX/CustomerOffer[]/@Action = "Delete" or "Activate". |
| . . /@RewardSetCount | String | 1 | Once | Required | Reward Set Count:<br>Number of Reward Set instances in this CustomerOffer[].<br>Value = 1–7 |
| . . /RewardSet[] | Aggregate List | 0 | One or Many | Required | Reward Set:<br>Encapsulates the details of a single Reward Set. This element must contain only one of the following available Reward Set type elements:<br>ItemDiscount<br>DeptDiscount<br>TotalDiscount<br>ReplacementPriceMethod1<br>Note that CustOfferRewards for FreeItem are not meaningful. |
| . . /RewardSet[]/<br>@RewardSetID | Enumerated String | 1 | Once | Required | Reward Set ID:<br>Value = 0–7<br>Value is determined by the @RewardSetID from the global @OfferID which is to be overlaid with the data in this RewardSet[].<br>Additionally, the @RewardSetID must refer to the same Reward Set type and be measured on the same @Basis as the global |

-continued

Customer Offer Rewards

| XML Element/ Attribute Tag | Data Type | Max Len | Occur | Usage | Description |
|---|---|---|---|---|---|
| | | | | | @OfferID, or an error will result. The system cannot successfully overlay the customer-specific data values onto the global Offer unless they are comparable. |
| ../RewardSet[]/ItemDiscount | Aggregate | 0 | Once | Optional | Item Discount: Element which encapsulates the details of the ItemDiscount Reward Set type. |
| ../RewardSet[]/ItemDiscount/@Basis | Enumerated String | 7 | Once | Required | Basis: Defines the basis on which Rewards will be given: Valid values: "Percent" = Percentage off. "Amount" = Amount off. See comments above regarding the need for compatibility with default rewards. |
| ../RewardSet[]/ItemDiscount/BasisValue | String | 10 | Once | Required | Basis Value: Metric of ../ItemDiscount/@Basis to be applied. If ../ItemDiscount/@Basis = Percent, then the value is the percentage discount in whole numbers. Value = 1–99 If ../ItemDiscount/@Basis = Amount, then the value is the discount amount in cents. Value = 1–2147483647 Note that the price of an item will never be reduced below zero. |
| ../RewardSet[]/DeptDiscount | Aggregate | 0 | Once | Optional | Department Discount: Element which encapsulates the details of the DeptDiscount Reward Set type. |
| ../RewardSet[]/DeptDiscount@Basis | Enumerated String | 7 | Once | Required | Basis: Defines the basis on which Rewards will be given: Valid values: "Percent" = Percentage off. "Amount" = Amount off. See comments above regarding the need for compatibility with default rewards. |
| ../RewardSet[]/DeptDiscount/BasisValue | String | 10 | Once | Required | Basis Value: Metric of ../ItemDiscount/@Basis to be applied. If ../ItemDiscount/@Basis = Percent, then the value is the percentage discount in whole numbers. Value = 1–99 If ../ItemDiscount/@Basis = Amount, then the value is the discount amount in cents. Value = 1–2147483647 Note that the price of an item will never be reduced below zero. |
| ../RewardSet[]/TotalDiscount | Aggregate | 0 | Once | Optional | Total Discount: Element which encapsulates the details of the TotalDiscount Reward Set type. |
| ../RewardSet[]/TotalDiscount/@Basis | Enumerated String | 8 | Once | Required | Basis: Defines the basis on which Rewards will be given: Valid values: "Percent" = Percentage off. |

-continued

Customer Offer Rewards

| XML Element/<br>Attribute Tag | Data Type | Max Len | Occur | Usage | Description |
|---|---|---|---|---|---|
| . . /RewardSet[]/<br>TotalDiscount/Basis<br>Value | String | 10 | Once | Required | "Amount" = Amount off.<br>See comments above regarding the need for compatibility with default rewards.<br>Basis Value:<br>Metric of<br>. . /ItemDiscount/@Basis to be applied.<br>If . . /ItemDiscount/@Basis = Percent, then the value is the percentage discount in whole numbers.<br>Value = 1–99<br>If . . /ItemDiscount/@Basis = Amount, then the value is the discount amount in cents.<br>Value = 1–2147483647<br>Note that the price of an item will never be reduced below zero. |
| . . /RewardSet[]/<br>ReplacememtPrice<br>Method1 | Aggregate | 0 | Once | Optional | Replacement Price Method 1: Element which encapsulates the details of the ReplacenentPriceMethod1 Reward Set type. |
| . . /RewardSet[]/<br>ReplacenentPrice<br>Method1/<br>DealPrice | String | 8 | Once | Required | Deal Price:<br>Total price, in cents, of DealQuantity units, where DealQuantity is defined in the default Rewards for @OfferID.<br>Value = 1–99999999 |

Customer Offer Store Routing

| XML Element/<br>Attribute Tag | Data Type | Max Len | Occur | Usage | Description |
|---|---|---|---|---|---|
| /SOX/CustomerOffer<br>[]/<br>CustOfferRouteReq | Aggregate | 0 | Once | Optional | CustomerOffer Route Request: Encapsulates CustomerOffer[] store routing request details. |
| . . /StoreList[] | Aggregate List | 0 | One or Many | Required | Store List:<br>Encapsulates details of all stores for which the same @Action is required for this @OfferID and @MerchantID/@CustomerID. |
| . . /StoreList[]/<br>@Action | Enumerated String | 7 | Once | Required | Action:<br>Defines maintenance operation to be performed for this StoreList[]<br>Valid values:<br>Add<br>Replace<br>Delete<br>Activate |
| . . /StoreList[]/<br>@StoreCount | String | 10 | Once | Required | Store Count:<br>The number of<br>. . /StoreList/Store[] entries to follow.<br>Value = 1–2147483647 |
| . . /StoreList[]/<br>Store[] | Aggregate List | 0 | One or Many | Required | Store:<br>Encapsulates the details of one store. |
| . . /StoreList[]/<br>Store[]/<br>StoreID | String | 10 | Once | Required | Store ID:<br>Assigned by ECN.<br>Unique Store Identifier.<br>Valid value: 1–2147483647 |
| . . /StoreList[]/<br>Store[]/ | String | 2 | Once | Required | Service Priority:<br>Indicates maximum processing |

Customer Offer Store Routing -continued

| XML Element/ Attribute Tag | Data Type | Max Len | Occur | Usage | Description |
|---|---|---|---|---|---|
| ServicePriority | | | | | delay for requested routing service. Supported values for the Pilot: "15 " = 15 Minutes "HR" = 1 Hour "ON" = Overnight "RT" = Real-time |

As previously mentioned, the OfferAck document type is the positive acknowledgement returned by network 13 upon its successful processing of an offer document type. A preferred format for this type of document, including its header, is identified in a tabular format as shown below.

Header

| XML Element/ Attribute Tag | Data Type | Max Len | Occur | Usage | Description |
|---|---|---|---|---|---|
| /SOX | Aggregate | 0 | Once | Required Always | Document Root Element: Identifies this as a SOX XML document. |
| . . /@Version | String | 3 | Once | Required Always | SOX Version of File: Version of SOX to which this document conforms. Value = 1.0 |
| . . /@SOXType | Enumerated String | 8 | Once | Required Always | Sox Type: Indicates type of SOX XML document. All SOX documents have this attribute with appropriate values. Value = OfferAck |

Offer Document Acknowledgement.

| XML Element/ Attribute Tag | Data Type | Max Len | Occur | Usage | Description |
|---|---|---|---|---|---|
| /SOX/OfferAck | Aggregate | 0 | Once | Required | Offer Acknowledgement: Encapsulates the acknowledgement of the receipt of the Offer document. |
| . . /DistributorID | String | 10 | Once | Required | Distributor ID: @OfferDistributorID in the Offer document. |
| . . /AckRequested | Enumerated String | 7 | Once | Required | Acknowledgement Requested: @AckRequested in the Offer document. |
| . . /SenderDocUID | String | 12 | Once | Required | Sender's Document Unique ID: @SenderDocUID in the Offer document. |
| . . /SessionID | String | 12 | Once | Required | Session ID: Generated by ECN. ECN ID for the session in which the Offer document was transmitted to the ECN. May be used for audit trail purposes. |
| . . /OffRcptCtrlID | String | 10 | Once | Required | Offer Receipt Control ID: Generated by ECN. ECN identifier used for tracking the Offer document. |

-continued

Offer Document Acknowledgement.

| XML Element/ Attribute Tag | Data Type | Max Len | Occur | Usage | Description |
|---|---|---|---|---|---|
| . . /SenderID | String | 8 | Once | Required | Sender ID: Generated by ECN. ECN user ID under which the Offer document was transmitted to the ECN. |
| . . /Date | Aggregate | 0 | Once | Required | Date: Generated by ECN. Date of OfferAck creation. |
| . . /Date/Year | String | 4 | Once | Required | Year: Format: CCYY |
| . . /Date/Month | String | 2 | Once | Required | Month: Format: MM |
| . . /Date/Day | String | 2 | Once | Required | Day: Format: DD |
| . . /Time | Aggregate | 0 | Once | Required | Time: Generated by ECN. Time of OfferAck creation. |
| . . /Time/Hour | String | 2 | Once | Required | Hour: Format: HH |
| . . /Time/Minute | String | 2 | Once | Required | Minute: Format: MM |
| . . /Time/Second | String | 2 | Once | Required | Second: Format: SS |
| . . /TimeZone | String | 3 | Once | Required | Time Zone: Generated by ECN. Time Zone for OfferAck creation timestamp. |

With respect to the Offer Document Acknowledgement format, the DistributorID parameter identifies a unique identification value for the offer distributor distributing the offer. The AckRequested parameter reflects the requested level of acknowledgement identified in the @AckRequested parameter of the header of the Offer document. The SenderDocUID parameter identifies the unique code identifying the XML document to its sender for audit trail purposes. The SessionID parameter is a unique identification value generated by network 13 identifying the session in which the Offer document was transmitted to it, and may also be used for audit trail purposes. The OffRcptCtrlID parameter is a unique identifier generated by network 13 for tracking the Offer document. The SenderID parameter is a unique identifier generated by network 13 representing the identity of the sender of the offer document under which the Offer document was transmitted to network 13. The Date and Time parameters are generated by the network 13 and identify the date and time, respectively, of the creation of the OfferAck document. A preferred format for the Offer Maintenance Request Acknowledgment and Offer Store Routing Acknowledgement are identified in tabular format below.

Offer Maintenance Request Acknowledgement

| XML Element/ Attribute Tag | Data Type | Max Len | Occur | Usage | Description |
|---|---|---|---|---|---|
| /SOX/Offer | Aggregate | 0 | Once | Required | Offer: Encapsulates results of Offer processing. |
| . . /@OfferID | String | 12 | Once | Required | Offer ID: @OfferID in the Offer document. |
| . . /OfferMaintReq | Aggregate | 0 | Once | Optional | Offer Maintenance Request: This element will exist if it was present in the processed Offer document. Encapsulates results of Offer maintenance processing. |
| . . /OfferMaintReq/@ Action | Enumerated String | 7 | Once | Required | Action: @Action in the Offer document. |
| /SOX/Offer/Offer MaintReq/ OfferProperties | Aggregate | 0 | | Optional | Offer Properties: This element will exist if it was present in the processed Offer document. Encapsulates results of Offer Properties processing. |
| . . /Status | String | 9 | Once | Required | Status: Generated by ECN. |

Offer Maintenance Request Acknowledgement

| XML Element/ Attribute Tag | Data Type | Max Len | Occur | Usage | Description |
|---|---|---|---|---|---|
| . . /Result | Aggregate | 0 | Once | Required | Valid Values: Success Result: See result structure above. |
| /SOX/Offer/Offer MaintReq/ OfferConditions | Aggregate | 0 | Once | Optional | Offer Conditions: This element will exist if it was present in the processed Offer document. Encapsulates results of Offer Conditions processing. |
| . . /@ConditionSet Count | String | 1 | Once | Required | Condition Set Count: Count of . . /ConditionSet[] elements to follow. |
| . . /ConditionSet[] | Aggregate List | 0 | One or Many | Required | Condition Set: Encapsulates the results of processing this @ConditionSetID. |
| . . /ConditionSet[]/ @ConditionSetID | Enumerated String | 1 | Once | Required | Condition Set ID: @ConditionSetID in the Offer document. |
| . . /ConditionSet[]/ Status | String | 9 | Once | Required | Status: Generated by ECN. Valid Values: Success |
| . . /ConditionSet[]/ Result | Aggregate | 0 | Once | Required | Result: See result structure above. |
| /SOX/Offer/Offer MaintReq/ OfferRewards | Aggregate | 0 | Once | Optional | Offer Rewards: This element will exist if it was present in the processed Offer document. Encapsulates results of Offer Rewards processing. |
| . . /@RewardSetCount | String | 1 | Once | Required | Reward Set Count: Count of . . /RewardSet[] elements to follow. |
| . . /RewardSet[] | Aggregate List | 0 | One or Many | Required | Reward Set: Encapsulates the results of processing this @RewardSetID. |
| . . /RewardSet[]/ @RewardSetID | Enumerated String | 1 | Once | Required | Reward Set ID: @RewardSetID in the Offer document. |
| . . /RewardSet[]/ Status | String | 9 | Once | Required | Status: Generated by ECN. Valid Values: Success |
| . . /RewardSet[]/ Result | Aggregate | 0 | Once | Required | Result: See result structure above. |

Offer Store Routing Acknowledgement.

Offer Store Routing Acknowledgement.

| XML Element/ Attribute Tag | Data Type | Max Len | Occur | Usage | Description |
|---|---|---|---|---|---|
| /SOX/Offer/Offer RouteReq | Aggregate | 0 | Once | Optional | Offer Routing Request: This element will exist if it was present in the processed Offer document. Encapsulates results of Offer routing processing. |
| . . /StoreList[] | Aggregate List | 0 | One or Many | Required | Store List: Encapsulates the details of stores for which the same @Action is required. |
| . . /StoreList[]/ @Action | Enumerated String | 7 | Once | Required | Action: @Action in the Offer document. |
| . . /StoreList[]/ | String | 10 | Once | Required | Store Count: |

-continued

Offer Store Routing Acknowledgement.

| XML Element/ Attribute Tag | Data Type | Max Len | Occur | Usage | Description |
|---|---|---|---|---|---|
| @StoreCount | | | | | Count of . . /Store[] elements to follow. |
| . . /StoreList[]/ Store[] | Aggregate List | 0 | One or Many | Required | Store: Encapsulates the details of one store. |
| . . /StoreList[]/ Store[]/ StoreID | String | 10 | Once | Required | Store ID: StoreID in the Offer document. |
| . . /StoreList[]/ Store[]/ ServicePriority | String | 2 | Once | Required | Service Priority: ServicePriority in the Offer document. |
| . . /StoreList[]/ Store[]/Status | String | 9 | Once | Required | Status: Generated by ECN. Valid Values: Success Scheduled |
| . . /StoreList[]/ Store[]/Result | Aggregate | 0 | Once | Required | Result: See result structure above. |

Likewise, a preferred format for the CustomerOfferAck document type (which has the same header format with a value for the @SOXType parameter being "CustomerOffer-Ack," and includes Offer Document Acknowledgement, CustomerOffer Maintenance Request Acknowledgement and CustomerOffer Store Routing Acknowledgement are provided below.

Offer Document Acknowledgement

| XML Element/ Attribute Tag | Data Type | Max Len | Occur | Usage | Description |
|---|---|---|---|---|---|
| /SOX/CustOfferAck | Aggregate | 0 | Once | Required | CustomerOffer Acknowledgement: Encapsulates the acknowledgement of the receipt of the CustomerOffer document. |
| . . /DistributorID | String | 10 | Once | Required | Distributor ID: @OfferDistributorID in the CustomerOffer document. |
| . . /AckRequested | Enumerated String | 7 | Once | Required | Acknowledgement Requested: @AckRequested in the CustomerOffer document. |
| . . /SenderDocUID | String | 12 | Once | Required | Sender's Document Unique ID: @SenderDocUID in the CustomerOffer document. |
| . . /SessionID | String | 12 | Once | Required | Session ID: Generated by ECN. ECN ID for the session in which the CustomerOffer document was transmitted to the ECN. May be used for audt trail purposes. |
| . . /OffRcptCtrlID | String | 10 | Once | Required | Offer Receipt Control ID: Generated by ECN. ECN identifier used for tracking the CustomerOffer document. |
| . . /SenderID | String | 8 | Once | Required | Sender ID: Generated by ECN. ECN user ID under which the CustomerOffer document was transmitted to the ECN. |
| . . /Date | Aggregate | 0 | Once | Required | Date: Generated by ECN. Date of CustomerOfferAck creation. |
| . . /Date/Year | String | 4 | Once | Required | Year: Format: CCYY |

-continued

Offer Document Acknowledgement

| XML Element/ Attribute Tag | Data Type | Max Len | Occur | Usage | Description |
|---|---|---|---|---|---|
| . . /Date/Month | String | 2 | Once | Required | Month: Format: MM |
| . . /Date/Day | String | 2 | Once | Required | Day: Format: DD |
| . . /Time | Aggregate | 0 | Once | Required | Time: Generated by ECN. Time of CustomerOfferAck creation. |
| . . /Time/Hour | String | 2 | Once | Required | Hour: Format: HH |
| . . /Time/Minute | String | 2 | Once | Required | Minute: Format: MM |
| . . /Time/Second | String | 2 | Once | Required | Second: Format: SS |
| . . /TimeZone | String | 3 | Once | Required | Time Zone: Generated by ECN. Time Zone for CustomerOfferAck creation timestamp. |

Customer Offer Maintenance Acknowledgement

| XML Element/ Attribute Tag | Data Type | Max Len | Occur | Usage | Description |
|---|---|---|---|---|---|
| /SOX/CustomerOffer | Aggregate | 0 | One or Many | Required | CustomerOffer: Encapsulates results of CustomerOffer processing. |
| . . /@OfferID | String | 12 | Once | Required | Offer ID: @OfferID in the CustomerOffer document. |
| . . /@MerchantID | String | 10 | Once | Required | Merchant ID: @MerchantID in the CustomerOffer document. |
| . . /@CustomerID | String | 18 | Once | Required | Customer ID: @CustomerID in the CustomerOffer document. |
| . . /CustOfferMaint Req | Aggregate | 0 | Once | Optional | CustomerOffer Maintenance Request: This element will exist if it was present in the processed CustomerOffer document. Encapsulates results of CustomerOffer maintenance processing. |
| . . /CustOfferMaint Req/@Action | Enumerated String | 7 | Once | Required | Action: @Action in the CustomerOffer document. |
| /SOX/CustomerOffer /CustOfferMaintReq/ CustOfferProperties | Aggregate | 0 | | Optional | CustomerOffer Properties: This element will exist if it was present in the processed CustomerOffer document. Encapsulates results of CustomerOffer Properties processing. |
| . . /Status | String | 9 | Once | Required | Status: Generated by ECN. Valid Values: Success |
| . . /Result | Aggregate | 0 | Once | Required | Result: See result structure above. |
| /SOX/CustomerOffer /CustOfferMaintReq/ CustOfferRewards | Aggregate | 0 | Once | Optional | CustomerOffer Rewards: This element will exist if it was present in the processed |

-continued

Customer Offer Maintenance Acknowledgement

| XML Element/ Attribute Tag | Data Type | Max Len | Occur | Usage | Description |
|---|---|---|---|---|---|
| | | | | | CustomerOffer document. Encapsulates results of CustomerOffer Rewards processing. |
| . . /@RewardSetCount | String | 1 | Once | Required | Reward Set Count: Count of . . /RewardSet[] elements to follow. |
| . . /RewardSet[]. . | Aggregate List | 0 | One or Many | Required | Reward Set: Encapsulates the results of processing this @RewardSetID. |
| . . /RewardSet[]/ @RewardSetID | Enumerated String | 1 | Once | Required | Reward Set ID: @RewardSetID in the CustomerOffer document. |
| . . /RewardSet[]/ Status | String | 9 | Once | Required | Status: Generated by ECN. Valid Values: Success |
| . . /RewardSet[]/ Result | Aggregate | 0 | Once | Required | Result: See result structure above. |

Customer Offer Store Routing Acknowledgement

| XML Element/ Attribute Tag | Data Type | Max Len | Occur | Usage | Description |
|---|---|---|---|---|---|
| /SOX/CustomerOffer /CustOfferRouteReq | Aggregate | 0 | Once | Optional | CustomerOffer Routing Request: This element will exist if it was present in the processed CustomerOffer document. Encapsulates results of Offer routing processing. |
| . . /StoreList[] | Aggregate List | 0 | One or Many | Required | Store List: Encapsulates the details of stores for which the same @Action is required. |
| . . /StoreList[]/ @Action | Enumerated String | 7 | Once | Required | Action: @Action in the CustomerOffer document. |
| . . /StoreList[]/ @StoreCount | String | 10 | Once | Required | Store Count: Count of . . /Store[] elements to follow. |
| . . /StoreList[]/ Store[] | Aggregate List | 0 | One or Many | Required | Store: Encapsulates the details of one store. |
| . . /StoreList[]/ Store[]/ StoreID | String | 10 | Once | Required | Store ID: StoreID in the Offer document. |
| . . /StoreList[]/ Store[]/ ServicePriority | String | 2 | Once | Required | Service Priority: ServicePriority in the Offer document. |
| . . /StoreList[]/ Store[]/ Status | String | 9 | Once | Required | Status: Generated by ECN. Valid Values: Success Scheduled |
| . . /StoreList[]/ Store[]/ Result | Aggregate | 0 | Once | Required | Result: See result structure above. |

As previously mentioned, the ErrorResponse document type is the negative acknowledgement returned by the network 13 upon encountering an error in the course of processing an Offer or Customer Offer document type. ErrorResponse documents adhere to the DTD represented as SOXErrorResponse.dtd in Appendix 1. The header for this document type is the same as that for the OfferAck and CustomerOfferAck document types, with the exception that the value for @SOXType parameter is "ErrorResponse." A preferred format for this document is shown in tabular format below.

| XML Element/ Attribute Tag | Data Type | Max Len | Occur | Usage | Description |
|---|---|---|---|---|---|
| /SOX/ErrorResponse | Aggregate | 0 | Once | Required | Error Response: Encapsulates the acknowledgement of the receipt of the Offer or CustomerOffer document. |
| . . /SenderDocUID | String | 12 | Once | Required | Sender's Document Unique ID: @SenderDocUID in the Offer or CustomerOffer document. |
| . . /ErrorCode | String | 10 | Once | Required | Error Code: Generated by ECN. Assigned according to the type and source of the Error Code. |
| . . /ErrorDescription | String | 255 | Once | Required | Error Description: Generated by ECN. The Error default text. |
| . . /ErrorCondition | String | 255 | Once | Required | Error Condition: Generated by ECN. Used to further explain the conditions that cause this Error code. |
| . . /ErrorMessage | String | 255 | Once | Required | Error Message: Generated by ECN. |
| . . /ErrorSource | String | 255 | Once | Required | Error Source: Generated by ECN. |
| . . /Date | Aggregate | 0 | Once | Required | Date: Generated by ECN. Date of ErrorResponse creation. |
| . . /Date/Year | String | 4 | Once | Required | Year: Format: CCYY |
| . . /Date/Month | String | 2 | Once | Required | Month: Format: MM |
| . . /Date/Day | String | 2 | Once | Required | Day: Format: DD |
| . . /Time | Aggregate | 0 | Once | Required | Time: Generated by ECN. Time of ErrorResponse creation. |
| . . /Time/Hour | String | 2 | Once | Required | Hour: Format: HH |
| . . /Time/Minute | String | 2 | Once | Required | Minute: Format: MM |
| . . /Time/Second | String | 2 | Once | Required | Second: Format: SS |
| . . /TimeZone | String | 3 | Once | Required | Time Zone: Generated by ECN. Time Zone for ErrorResponse creation timestamp. |
| . . /SessionID | String | 12 | Once | Required | Session ID: Generated by ECN. ECN ID for the session in which the CustomerOffer document was transmitted to the ECN. May be used for audit trail purposes. |
| . . /OffRcptCtrlID | String | 10 | Once | Required | Offer Receipt Control ID: Generated by ECN. ECN identifier used for tracking the Offer or CustomerOffer document. |
| . . /SenderID | String | 8 | Once | Required | Sender ID: Generated by ECN. ECN user ID under which the Offer or CustomerOffer document was transmitted to the ECN. |
| . . /DTDErrorList | Aggregate | 0 | Once | Required | DTD Error List: Generated by ECN. Encapsulates reporting of DTD violations. |
| . . /DTDErrorList/ @DTDErrorCount | String | 10 | Once | Required | DTD Error Count: Count of . . /DTDError[] elements to follow. |

-continued

| XML Element/ Attribute Tag | Data Type | Max Len | Occur | Usage | Description |
|---|---|---|---|---|---|
| .../DTDErrorList/ DTDError[] | Aggregate List | 0 | One or Many | Required | DTD Error: Encapsulates the details of one DTD error. |
| .../DTDErrorList/ DTDError[]/PathName | String | 255 | Once | Required | Path Name: Path of DTD Error within the XML document. |
| .../DTDErrorList/ DTDError[]/ErrorCode | String | 10 | Once | Required | Error Code: Assigned according to the type and source of the Error Code. |
| .../DTDErrorList/ DTDError[]/Error Message | String | 255 | Once | Required | Error Message: Text description of the DTD Error. |

In particular, the parameter SenderDocUID represents the unique code identifying the XML document to its sender. The ErrorCode parameter represents the code assigned by the network 13 for the type and source of the error. The ErrorDescription parameter represents a description of the error generated by the network 13. The ErrorCondition parameter is generated by the network 13 and represents the condition(s) that caused the generation of the error code. The ErrorMessage parameter identifies an error message generated by the network 13 based on the error code. The ErrorSource parameter represents the source of the error generated by the network 13. The Date and Time parameters identify the date and time, respectively, in which the ErrorResponse document is created. The SessionID parameter represents the identification value assigned by the network 13 for the session in which the Offer or CustomerOffer document was transmitted to the network 13. The OfrRptCtrlID parameter represents an identifier generated by the network 13 which is used for tracking the Offer or CustomerOffer document. The ServerID parameter represents the identification value generated by the network 13 under which the Offer or OfferCustomer document was transmitted to the network 13. The DTDErrorList element encapsulates the reporting of DTD violations, including the count of error containing elements to follow, the details of each DTD error, which comprises the path of the DTD error within the XML document, the error code, and the error message.

The details of the offers being distributed by each offer distributor 12 are electronically communicated to a network server 22 of system 10, such as an IBM RS6000 server, preferably in real time. Connections to server 22 are made over the Internet via the HTTP protocol using X.509 certificates to identify and authenticate the sender. Server 22 is configured to receive and authenticate all offers having a uniform format such as that previously described herein. With respect to offers distributed to customers in a non-interactive medium, the offer details are communicated to server 22 prior to being presented to the customers. In the case of a kiosk offer distributor, the offer is distributed via a communications network (not shown), such as the Internet, to a kiosk 16 in communication therewith. Kiosk 16 may be directly in communication with the POS system 27 of the store in which it is located.

System 10 generates point-of-sale (POS) maintenance files that reflect all of the offers received from the offer distributors 12 and authenticated by server 22. These files are stored within a database of network 13 (not shown), preferably in a consolidated manner whereby information related to all offers available from various offer distributors at a given retailer can be viewed online by customers via a browser interface 30 thereto. These files may be forwarded to the appropriate retailer 26 for placement on the POS systems 27 of the relevant stores 28 in which the offer is valid or a server of network 13 such as server 22 may place the files directly on the POS system 27 of the relevant stores 28 in which the offer is valid.

In one embodiment, network 13 provides for the possibility of coooperation between agents and partners in presenting offers to customers or in recording the customer's acceptance of an offer. Once a business relationship between the cooperating parties is established, the network 13 sets up the proper information pathways so that the XML documents created by the network 13 can be routed to agents or partners for the purpose of synchronizing information between the parties so that everyone has an exact copy of the information received by the network 13 from the offer distributors 12. The preferred formats of the relevant Offer Agent Server Routing, CustomerOffer Agent Server Routing, Agent Server Offer Acknowledgement and Agent Server Customer Offer Acknowledgement documents are described below.

Offer Agent Server Routing

| XML Element/ Attribute Tag | Data Type | Max Len | Occur | Usage | Description |
|---|---|---|---|---|---|
| /SOX/TargetServer List | Aggregate | 0 | Once | Optional | Target Server List: This element is not required. Defines Agent servers to which this document is to be forwarded. |
| .../@ServerCount | String | 6 | Once | Required | Server Count: The number of |

-continued

Offer Agent Server Routing

| XML Element/<br>Attribute Tag | Data Type | Max Len | Occur | Usage | Description |
|---|---|---|---|---|---|
| . . /Server[] | Aggregate List | 0 | One or Many | Required | . . /TargetServerList/Server[] entries to follow.<br>Value = 1–999999<br>Server:<br>Encapsulates details for one Agent server. |
| . . /Server[]ServerID | String | 6 | Once | Required | Agent Server ID:<br>Assigned by the ECN<br>Target Agent Server ID to Receive a copy of this document.<br>Value = 1–999999 |
| . . /Server[]/Service Priority | String | 2 | One | Required | Service Priority:<br>Indicates maximum processing delay for requested routing service.<br>Supported values:<br>"15" = 15 Minutes<br>"HR" = 1 Hour<br>"ON" = Overnight<br>"RT" = Real-time |

CustomerOffer Agent Server Routing

| XML Element/<br>Attribute Tag | Data Type | Max Len | Occur | Usage | Description |
|---|---|---|---|---|---|
| /SOX/TargetServerList | Aggregate | 0 | Once | Optional | Target Server List:<br>This elenent is not required.<br>Defines Agent servers to which this document is to be forwarded. |
| . . /@ServerCount | String | 6 | Once | Required | Server Count:<br>The number of . . /TargetServerList/Server[] entries to follow.<br>Value = 1–999999 |
| . . /Server[] | Aggregate List | 0 | One or Many | Required | Server:<br>Encapsulates details for one Agent server. |
| . . /Server[]/ServerID | String | 6 | Once | Required | Agent Server ID:<br>Assigned by the ECN.<br>Target Agent Server ID to receive a copy of this document.<br>Value = 1–999999 |
| . . /Server[]/ServicePriority | String | 2 | Once | Required | Service Priority:<br>Indicates maximum processing delay for requested routing service.<br>Supported values:<br>"15" = 15 Minutes<br>"HR" = 1 Hour<br>"ON" = Overnight<br>"RT" = Real-time |

Agent Server Offer Acknowledgement

| XML Element/<br>Attribute Tag | Data Type | Max Len | Occur | Usage | Description |
|---|---|---|---|---|---|
| /SOX/TargetServerList | Aggregate | 0 | Once | Optional | Target Server List:<br>This element will exist if it was present in the Offer document, and encapsulates the results of Server Routing Request processing. |

-continued

Agent Server Offer Acknowledgement

| XML Element/ Attribute Tag | Data Type | Max Len | Occur | Usage | Description |
|---|---|---|---|---|---|
| . . /@ServerCount | String | 6 | Once | Required | Server Count: Count of . . /TargetServerList/Server[] elements to follow. Value = 1–999999 |
| . . /Server[] | Aggregate List | 0 | One or Many | Required | Server: Encapsulates details for one Agent server. |
| . . /Server[]/ServerID | String | 6 | Once | Required | ServerID: Requested ServerID. |
| . . /Server[]/Service Priority | String | 2 | Once | Required | Service Priority: Requested service priority. |
| . . /Server[]/Status | String | 9 | Once | Required | Status: Generated by ECN. Valid Values: Success Scheduled |
| . . /Server[]/Result | Aggregate | 0 | Once | Required | Result: See result structure above. |

Agent Server Customer Offer Acknowledgement

| XML Element/ Attribute Tag | Data Type | Max Len | Occur | Usage | Description |
|---|---|---|---|---|---|
| /SOX/TargetServer List | Aggregate | 0 | Once | Optional | Target Server List: This element will exist if it was present in the CustomerOffer document, and encapsulates the results of Server Routing Request processing. |
| . . /@ServerCount | String | 6 | Once | Required | Server Count: Count of . . /TargetServerList/Server[] elements to follow. Value = 1–999999 |
| . . /Server[] | Aggregate List | 0 | One or Many | Required | Server: Encapsulates details for one Agent server. |
| . . /Server[]/ServerID | String | 6 | Once | Required | ServerID: Requested ServerID. |
| . . /Server[]/Service Priority | String | 2 | Once | Required | Service Priority: Requested service priority. |
| . . /Server[]/Status | String | 9 | Once | Required | Status: Generated by ECN. Valid Values: Success Scheduled |
| . . /Server[]/Result | Aggregate | 0 | Once | Required | Result: See result structure above. |

Customers redeem offers at a store electronically preferably via their loyalty cards or some other identification mechanism during the checkout process. The POS system 26 of that store integrates the offer details in the POS maintenance files received from server 22 into its POS master offer detail files so that the condition(s) associated with the offers can be validated. In a preferred embodiment, the validation is performed by FREEDOM-Shopper sold by Matra Systems. In one embodiment, this process is performed in batch mode given the processing-intensive nature of the operation that could adversely affect daily checkout operations.

POS system 26 generates transaction log files for any transactions at the stores 28 involving offers distributed by the offer distributors 12. These transaction log files are forwarded to system 10 for clearance and settlement. Clearing is the set of functions required to collect and analyze the transaction log files received by POS system 26 to extract the detail of the rewards given or due to customers, and to prepare the details of settlement required by the settlement agent. Clearing also includes extracting information from the transaction log files and comparing it against the corresponding offer details stored within the databases of network 13 in order to validate same. In one embodiment, clearance is performed via a program on the server 22 of the network 13. In a preferred embodiment, offer distributors 12 are notified of the redemption of their respective offers by means of a query service or XML-based data feed provided by server 22.

Once each offer is cleared, settlement of the offer with the appropriate settlement agent is performed. Settlement is the process of ensuring that the financial obligations associated with each offer are carried out. Specifically, the retailer is reimbursed for the value of rewards deducted from customer transactions involving offers. Payment must be arranged for fees due to the retailer and other parties for the processing and handling of the offer. Such settlement details are communicated electronically to a settlement agent 34 to complete settlement of the offer with the respective parties to the transaction.

Due to the centralized nature of the system 10 and the standardization of offers provided by the network 13, retailers can automatically accept offers from a plurality of different offer distributors, thereby relieving their burden to maintain sophisticated customer/price management systems. Moreover, system 10 allows paperless offer clearing at the POS level. In addition, system 10 provides for automatic settlement of offers which helps accelerate payment of the financial obligations associated therewith. In addition, given the centralized nature of the transaction information stored within the network 13, directories can be set up by network 13 whereby offer distributors, customers, stores, and other interested parties can easily look up information related to offers provided thorugh network 13.

Furthermore, network 13 provides for the dynamic targeting of customers. The value of customer targeting is derived from wasting less money on promotional activity. Promotions are inherently wasteful because a large amount of the expenditures are not used to alter customer behavior. Promotion costs can be classified primarily into three areas; namely media costs, redemption costs and handling and administrative costs. Media costs are the cost of exposing customers to a promotion offer. Media costs include the advertising cost for placing promotional ads in newspapers, magazines, or on the Internet offer, and direct mail cost to send offers to households. Redemption costs are the cost of the discount. Cash discounts and other rewards have direct costs. Handling and administrative costs are inherent with coupon offers, which generally have costs associated with having the coupons counted and for billing and administration. Additionally, coupon issuers provide a fee to the retailer to cover their costs in handling the coupon. Moreover, all promotions require systems to accrue, track and generally administer promotions.

The value of an offer is equal to the profit for incremental sales less the sum of media, redemption and handling and administrative costs associated therewith. Targeting offers can impact the value of an offer dramatically by lowering the overall costs and more particularly the cost per incremental case. Dynamic customer targeting is greatly enhanced by the system 10, specifically, due to the centralized nature in which the network 13 manages offer transactions. In particular, system 10 categorizes customer profiles into three types; namely static, persistent and dynamic. Static profiles represent lifestyle and geo-demographic characteristics and are not changed by marketing activities. Persistent profiles are characterized by buying behavior that is relatively stable and only somewhat altered by marketing activities. Dynamic profiles are characterized by buying behavior that can directly be attributed to marketing activities like discounts and new product introductions.

Figure 2:
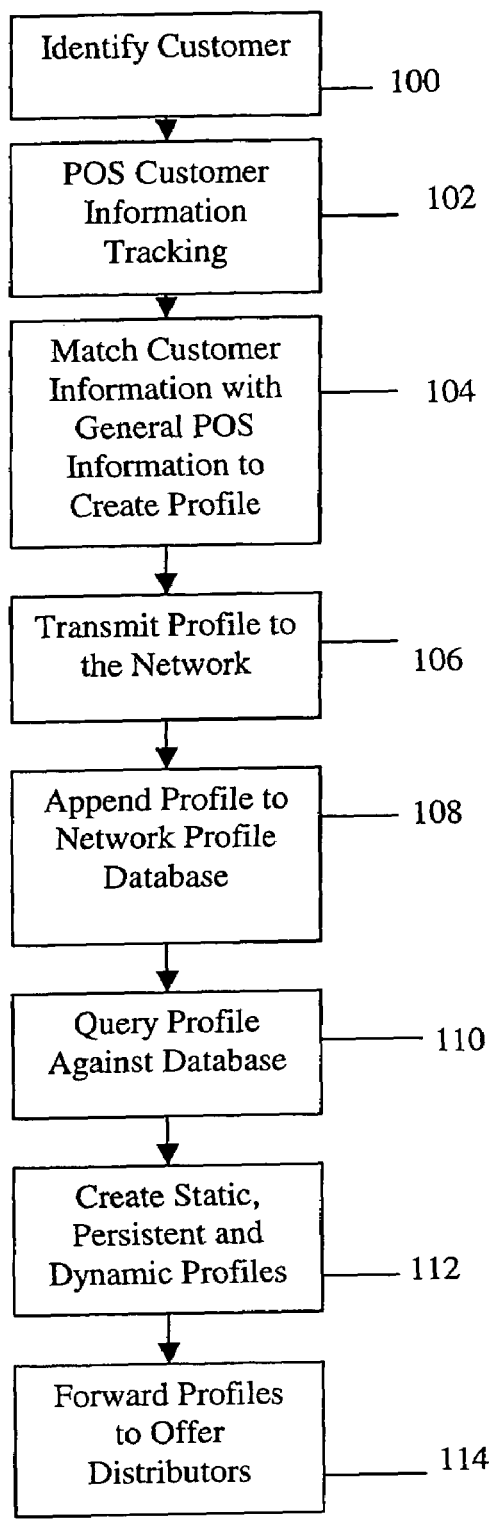
FIG. 2 is a flowchart representing the process of dynamic profiling provided by the system of FIG. 1

Referring now to FIG. 2, the process of dynamic customer targeting according to the present invention is described. For the purposes of discussion, it will be assumed that customers are identified to the network 13 through a loyalty card. However, it can be appreciated by one skilled in the art that any method of customer identification can be used. At 100, a customer is identified via a loyalty card being scanned at the checkout counter of a store. At 102, the POS system of that store tracks a plurality of information such as the customer's identification number, the time, the checkout lane, the products purchased, the prices paid and the quantities purchased. At 104, the POS system matches this information with information stored within the POS system, such as full pricing information, discount information, display activity, advertising activity and baseline sales, to create a customer profile. At 106, the profile is transmitted to the network 13 and at 108, the profile is appended to a "master" database stored within a database of the network 13. At 110, the customer profile is queried against this database to create the static, persistent and dynamic profiles at 112. At 114, the customer profiles are forwarded to the appropriate offer distributor 12 so they can dynamically target customers based on such profiles.

To illustrate the advantages of dynamic profiling, FIGS. 3A–D illustrate an example of an offer for spaghetti sauce distributed based on a non-targeted profile, a static profile, a persistent profile and a dynamic profile, respectively. As shown, the dynamic profile provides a net value of $24,000, while the non-targeted and static profiles provide no value, and the persistent profile provides only a $3,975 value. Therefore, for spaghetti sauce, it is unlikely that static profile will greatly distinguish large numbers of spaghetti sauce customers from non-spaghetti sauce customer. In other words, static profile type offers will not add to the value of the promotion.

The foregoing constitutes a description of various features of a preferred embodiment. Numerous changes to the preferred embodiment are possible without departing from the spirit and scope of the invention. Hence, the scope of the invention should be determined with reference not to the preferred embodiment, but to the following claims:

APPENDIX 1

DTD: SOXOffer.dtd.

```
<?xml version="1.0" encoding="UTF-8"?>
<!--
Standard Offer Exchange: Offer DTD
SOXOffer.dtd
Version 1.0 Draft
Date: 06/09/2000
ems, Copyright 2000
-->
<!--                          -->
<!--     Revision History     -->
```

APPENDIX 1-continued

```
<!--                                  -->
<!--     SOX top element              -->
<!--                                  -->
<!ELEMENT SOX ((TargetServerList, Offer) | (Offer))>
<!ATTLIST SOX
OfferDistributorID CDATA #REQUIRED
SenderDocUID CDATA #REQUIRED
Version CDATA #REQUIRED
AckRequested (Normal | Terse | Verbose) #REQUIRED
SOXType (Offer) #REQUIRED
>
<!--                                                                  -->
<!--     Target Server List element: Optional. Offer Agent Routing Information   -->
<!--                                                                  -->
<!ELEMENT TargetServerList (Server+)>
<!ATTLIST TargetServerList
ServerCount CDATA #REQUIRED
>
<!ELEMENT Server (ServerID, ServicePriority)>
<!ELEMENT ServerID (#PCDATA)>
<!ELEMENT ServicePriority (#PCDATA)>
<!--                                                                  -->
<!--     Offer element: Required. Limit one Offer per document.       -->
<!--                                                                  -->
<!ELEMENT Offer ((OfferMaintReq, OfferRouteReq) | (OfferMaintReq) | (OfferRouteReq))>
<!ATTLIST Offer
OfferID CDATA #REQUIRED
>
<!--                                                                  -->
<!--     Offer Maintenance Request element: Offer Properties, Offer Conditions,  -->
<!--     Offer Rewards not needed for Delete action, required for Add or Replace. -->
<!--                                                                  -->
<!ELEMENT OfferMaintReq (OfferProperties, OfferConditions, OfferRewards)?>
<!ATTLIST OfferMaintReq
Action (Add | Replace | Delete) #REQUIRED
>
<!--                                                                  -->
<!--     Offer Properties element:                                    -->
<!--                                                                  -->
<!ELEMENT OfferProperties (MemberOffer, StaffAllowed, OfferType, OfferXactLimit, OfferCustLimit,
OfferStartDateTime, OfferEndDateTime, OfferDescription, OfferReportDescription, OfferSponsorSettlementID,
DeferredReward)>
<!ELEMENT MemberOffer (#PCDATA)>
<!ELEMENT StaffAllowed (#PCDATA)>
<!ELEMENT OfferType (#PCDATA)>
<!ELEMENT OfferXactLimit (#PCDATA)>
<!ELEMENT OfferCustLimit EMPTY>
<!ELEMENT OfferStartDateTime (Year, Month, Day, Hour, Minute)>
<!ELEMENT Year (#PCDATA)>
<!ELEMENT Month (#PCDATA)>
<!ELEMENT Day (#PCDATA)>
<!ELEMENT Hour (#PCDATA)>
<!ELEMENT Minute (#PCDATA)>
<!ELEMENT OfferEndDateTime (Year, Month, Day, Hour, Minute)>
<!ELEMENT OfferDescription (#PCDATA)>
<!ELEMENT OfferReportDescription (#PCDATA)>
<!ELEMENT OfferSponsorSettlementID (#PCDATA)>
<!ELEMENT DeferredReward (#PCDATA)>
<!--                                  -->
<!--     Offer Conditions element:    -->
<!--                                  -->
<!ELEMENT OfferConditions (Condition Set+)>
<!ATTLIST OfferConditions
ConditionSetCount CDATA #REQUIRED
>
<!ELEMENT ConditionSet (ItemPurchase | DeptPurchase | TotalPurchase | TimeOfDay | DayOfWeek)>
<!ATTLIST ConditionSet
ConditionSetID (0 | 1 | 2 | 3 | 4 | 5 | 6 | 7) #REQUIRED
>
<!--                                  -->
<!--     Offer Condition: Item Purchase   -->
<!--                                  -->
<!ELEMENT ItemPurchase (ItemList, CondChkFlag, MeasureValue)>
<!ATTLIST ItemPurchase
Measure (Quantity | Weight | Amount) #REQUIRED
>
<!ELEMENT ItemList (Item+)>
<!ATTLIST ItemList
ItemCount CDATA #REQUIRED
```

APPENDIX 1-continued

```
>
<!ELEMENT item (#PCDATA)>
<!ELEMENT CondChkFlag (#PCDATA)>
<!ELEMENT MeasureValue (#PCDATA)>
<!--                                                    -->
<!--        Offer Condition: Department Purchase        -->
<!--                                                    -->
<!ELEMENT DeptPurchase (DeptList, CondChkFlag, Amount)>
<!ELEMENT DeptList (Dept+)>
<!ATTLIST DeptList
DeptCount CDATA #REQUIRED
>
<!ELEMENT Dept (#PCDATA)>
<!ELEMENT Amount (#PCDATA)>
<!--                                                    -->
<!--        Offer Condition: Total Purchase             -->
<!--                                                    -->
<!ELEMENT TotalPurchase (CondChkFlag, Amount)>
<!ATTLIST TotalPurchase
Includes (All | Discountable) #REQUIRED
>
<!--                                                    -->
<!--        Offer Condition: Time of Day                -->
<!--                                                    -->
<!ELEMENT TimeOfDay (StartTime, EndTime)>
<!ELEMENT StartTime (Hour, Minute)>
<!ELEMENT EndTime (Hour, Minute)>
<!--                                                    -->
<!--        Offer Conditions: Day of the Week           -->
<!--                                                    -->
<!ELEMENT DayOfWeek (Sunday, Monday, Tuesday, Wednesday, Thursday, Friday, Saturday)>
<!ELEMENT Sunday (#PCDATA)>
<!ELEMENT Monday (#PCDATA)>
<!ELEMENT Tuesday (#PCDATA)>
<!ELEMENT Wednesday (#PCDATA)>
<!ELEMENT Thursday (#PCDATA)>
<!ELEMENT Friday (#PCDATA)>
<!ELEMENT Saturday (#PCDATA)>
<!--                                                    -->
<!--        Offer Rewards element:                      -->
<!--                                                    -->
<!ELEMENT OfferRewards (RewardSet+)>
<!ATTLIST OfferRewards
RewardSetCount CDATA #REQUIRED
>
<!ELEMENT RewardSet (ItemDiscount | DeptDiscount | TotalDiscount | FreeItem | ReplacementPriceMethod1)>
<!ATTLIST RewardSet
RewardSetID (0 | 1 | 2 | 3 | 4 | 5 | 6 | 7) #REQUIRED
>
<!--                                                    -->
<!--        Offer Reward: Item Discount                 -->
<!--                                                    -->
<!ELEMENT ItemDiscount (ItemList, RewardLimit, BasisValue)>
<!ATTLIST ItemDiscount
Basis (Percent | Amount) #REQUIRED
>
<!ELEMENT RewardLimit (#PCDATA)>
<!ELEMENT BasisValue (#PCDATA)>
<!--                                                    -->
<!--        Offer Reward: Department Discount           -->
<!--                                                    -->
<!ELEMENT DeptDiscount (DeptList, RewardLimit, BasisValue)>
<!ATTLIST DeptDiscount
Basis (Percent | Amount) #REQUIRED
>
<!--                                                    -->
<!--        Offer Reward: Total Discount                -->
<!--                                                    -->
<!ELEMENT TotalDiscount (RewardLimit, BasisValue)>
<!ATTLIST TotalDiscount
Basis (Percent | Amount) #REQUIRED
>
<!--                                                    -->
<!--        Offer Reward: Free Item                     -->
<!--                                                    -->
<!ELEMENT FreeItem (ItemList, RewardLimit)>
<!--                                                    -->
<!--        Offer Reward: Replacement Price Method1     -->
<!--                                                    -->
```

APPENDIX 1-continued

```
<!ELEMENT ReplacementPriceMethod1 (ItemList, DealPrice, DealQuantity, RewardLimit)>
<!ELEMENT DealPrice (#PCDATA)>
<!ELEMENT DealQuantity (#PCDATA)>
<!--                                                        -->
<!--     Offer Route Store Request element: Optional.       -->
<!--                                                        -->
<!ELEMENT OfferRouteReq (StoreList+)>
<!--                                        -->
<!--     Store List element: Required.      -->
<!--                                        -->
<!ELEMENT StoreList (Store+)>
<!ATTLIST StoreList
Action (Add | Replace | Delete) #REQUIRED
StoreCount CDATA #REQUIRED
>
<!ELEMENT Store (StoreID, ServicePriority)>
<!ELEMENT StoreID (#PCDATA)>
DTD: SOXCustomerOffer.dtd.

<?xml version="1.0" encoding="UTF-8"?>
<!--
Standard Offer Exchange: Customer Offer DTD
SOXCustomerOffer.dtd
Version 1.0 Draft
Date: 06/09/2000
ems, Copyright 2000
-->
<!--                                 -->
<!--     Revision History            -->
<!--                                 -->
<!--     SOX top element             -->
<!--                                 -->
<!ELEMENT SOX ((TargetServerList, CustomerOffer+) | (CustomerOffer+))>
<!ATTLIST SOX
OfferDistributorID CDATA #REQUIRED
SenderDocUID CDATA #REQUIRED
Version CDATA #REQUIRED
AckRequested (Normal | Terse | Verbose) #REQUIRED
CustomerOfferCount CDATA #REQUIRED
SOXType (CustomerOffer) #REQUIRED
>
<!--                                                                                    -->
<!--     Target Server List element: Optional. Customer Offer Agent Server Routing Information -->
<!--                                                                                    -->
<!ELEMENT TargetServerList (Server+)>
<!ATTLIST TargetServerList
ServerCount CDATA #REQUIRED
>
<!ELEMENT Server (ServerID, ServicePriority)>
<!ELEMENT ServerID (#PCDATA)>
<!ELEMENT ServicePriority (#PCDATA)>
<!--                                                                              -->
<!--     Customer Offer element: Required. One or more Customer Offers per document. -->
<!--                                                                              -->
<!ELEMENT CustomerOffer ((CustOfferMaintReq, CustOfferRouteReq) | (CustOfferMaintReq) |
(CustOfferRouteReq))>
<!ATTLIST CustomerOffer
OfferID CDATA #REQUIRED
MerchantID CDATA #REQUIRED
CustomerID CDATA #REQUIRED
>
<!ELEMENT CustOfferMaintReq ((CustOfferProperties, CustOfferRewards)? | (CustOfferProperties))>
<!ATTLIST CustOfferMaintReq
Action (Add | Replace | Delete | Activate) #REQUIRED
>
<!--                                                   -->
<!--     Customer Offer Properties element:            -->
<!--                                                   -->
<!ELEMENT CustOfferProperties ((OfferXactLimit, OfferCustLimit) | (OfferXactLimit))>
<!ELEMENT OfferXactLimit (#PCDATA)>
<!ELEMENT OfferCustLimit (#PCDATA)>
<!--                                              -->
<!--     Customer Offer Rewards element:          -->
<!--                                              -->
<!ELEMENT CustOfferRewards (RewardSet+)>
<!ATTLIST CustOfferRewards
RewardSetCount CDATA #REQUIRED
>
<!--                                                                              -->
```

APPENDIX 1-continued

```
<!--      Customer Offer Rewards Set element: Overrides existing Offer Reward Set.       -->
<!--                                                                                      -->
<!ELEMENT RewardSet (ItemDiscount | DeptDiscount | TotalDiscount | ReplacementPriceMethod1)>
<!ATTLIST RewardSet
RewardSetID (0 | 1 | 2 | 3 | 4 | 5 | 6 | 7) #REQUIRED
>
<!--                                                 -->
<!--      Customer Offer Reward: Item Discount       -->
<!--                                                 -->
<!ELEMENT ItemDiscount (BasisValue)>
<!ATTLIST ItemDiscount
Basis (Percent | Amount) #REQUIRED
>
<!ELEMENT BasisValue (#PCDATA)>
<!--                                                       -->
<!--      Customer Offer Reward: Department Discount       -->
<!--                                                       -->
<!ELEMENT DeptDiscount (BasisValue)>
<!ATTLIST DeptDiscount
Basis (Percent | Amount) #REQUIRED
>
<!--                                                 -->
<!--      Customer Offer Reward: Total Discount      -->
<!--                                                 -->
<!ELEMENT TotalDiscount (BasisValue)>
<!ATTLIST TotalDiscount
Basis (Percent | Amount) #REQUIRED
>
<!--                                                            -->
<!--      Customer Offer Reward: Replacement Price Method1      -->
<!--                                                            -->
<!ELEMENT ReplacementPriceMethod1 (DealPrice)>
<!ELEMENT DealPrice (#PCDATA)>
<!--                                                                 -->
<!--      Customer Offer Route Store Request element: Optional.      -->
<!--                                                                 -->
<!ELEMENT CustOfferRouteReq (StoreList+)>
<!--                                            -->
<!--      Store List element: Required.         -->
<!--                                            -->
<!ELEMENT StoreList (Store+)>
<!ATTLIST StoreList
Action (Add | Replace | Delete | Activate) #REQUIRED
StoreCount CDATA #REQUIRED
>
<!ELEMENT Store (StoreID, ServicePriority)>
<!ELEMENT StoreID (#PCDATA)>
DTD: SOXOfferAck.dtd.

<?xml version="1.0" encoding="UTF-8"?>
<!--
Standard Offer Exchange: Offer Acknowledgement DTD
SOXOfferAck.dtd
Version 1.0 Draft
Date: 06/09/2000
ems, Copyright 2000
-->
<!--                                 -->
<!--      Revision History            -->
<!--                                 -->
<!--      SOX top element             -->
<!--                                 -->
<!ELEMENT SOX ((OfferAck, TargetServerList, Offer) | (OfferAck, Offer))>
<!ATTLIST SOX
Version CDATA #REQUIRED
SOXType (OfferAck) #REQUIRED
>
<!--                                                                      -->
<!--      Offer Acknowledgement elements: For this Offer document.        -->
<!--                                                                      -->
<!ELEMENT OfferAck (DistributorID, AckRequested, SenderDocUID, SessionID, OfrRcptCtrlID, SenderID, Date,
Time, TimeZone)>
<!ELEMENT DistributorID (#PCDATA)>
<!ELEMENT AckRequested (#PCDATA)>
<!ELEMENT SenderDocUID (#PCDATA)>
<!ELEMENT SessionID (#PCDATA)>
<!ELEMENT OfrRcptCtrlID (#PCDATA)>
<!ELEMENT SenderID (#PCDATA)>
<!ELEMENT Date (Year, Month, Day)>
```

APPENDIX 1-continued

```
<!ELEMENT Year (#PCDATA)>
<!ELEMENT Month (#PCDATA)>
<!ELEMENT Day (#PCDATA)>
<!ELEMENT Time (Hour, Minute, Second)>
<!ELEMENT Hour (#PCDATA)>
<!ELEMENT Minute (#PCDATA)>
<!ELEMENT Second (#PCDATA)>
<!ELEMENT TimeZone (#PCDATA)>
<!--                                                                      -->
<!--    Status and Result elements: For each Offer Agent Server Routing Request -->
<!--                                                                      -->
<!ELEMENT TargetServerList (Server+)>
<!ATTLIST TargetServerList
ServerCount CDATA #REQUIRED
>
<!ELEMENT Server (ServerID, ServicePriority, Status, Result)>
<!ELEMENT ServerID (#PCDATA)>
<!ELEMENT ServicePriority (#PCDATA)>
<!ELEMENT Status (#PCDATA)>
<!ELEMENT Result (ResultCode, ResultSeverity, ResultDescription, ResultCondition)>
<!ELEMENT ResultCode (#PCDATA)>
<!ELEMENT ResultSeverity (#PCDATA)>
<!ELEMENT ResultDescription (#PCDATA)>
<!ELEMENT ResultCondition (#PCDATA)>
<!--                            -->
<!--    Offer element:          -->
<!--                            -->
<!ELEMENT Offer ((OfferMaintReq, OfferRouteReq) | (OfferMaintReq) | (OfferRouteReq))>
<!ATTLIST Offer
OfferID CDATA #REQUIRED
>
<!--                                          -->
<!--    Offer Maintenance Request element     -->
<!--                                          -->
<!ELEMENT OfferMaintReq (OfferProperties, OfferConditions, OfferRewards)?>
<!ATTLIST OfferMaintReq
Action (Add | Replace | Delete) #REQUIRED
>
<!--                                                        -->
<!--    Status and Result elements: For Offer Properties    -->
<!--                                                        -->
<!ELEMENT OfferProperties (Status, Result)>
<!--                                                              -->
<!--    Status and Result elements: For each Offer Conditions Set -->
<!--                                                              -->
<!ELEMENT OfferConditions (ConditionSet+)>
<!ATTLIST OfferConditions
ConditionSetCount CDATA #REQUIRED
>
<!ELEMENT ConditionSet (Status, Result)>
<!ATTLIST ConditionSet
ConditionSetID (0 | 1 | 2 | 3 | 4 | 5 | 6 | 7) #REQUIRED
>
<!--                                                          -->
<!--    Status and Result elements: For each Offer Rewards Set -->
<!--                                                          -->
<!ELEMENT OfferRewards (RewardSet+)>
<!ATTLIST OfferRewards
RewardSetCount CDATA #REQUIRED
>
<!ELEMENT RewardSet (Status, Result)>
<!ATTLIST RewardSet
RewardSetID (0 | 1 | 2 | 3 | 4 | 5 | 6 | 7) #REQUIRED
>
<!--                                                                -->
<!--    Status and Result elements: For each Offer Store Route Request -->
<!--                                                                -->
<!ELEMENT OfferRouteReq (StoreList+)>
<!ELEMENT StoreList (Store+)>
<!ATTLIST StoreList
Action (Add | Replace | Delete) #REQUIRED
StoreCount CDATA #REQUIRED
>
<!ELEMENT Store (StoreID, ServicePriority, Status, Result)>
<!ELEMENT StoreID (#PCDATA)>
DTD: SOXCustomerOfferAck.dtd.

<?xml version="1.0" encoding="UTF-8"?>
<!--
```

APPENDIX 1-continued

```
Standard Offer Exchange: Customer Offer Acknowledgement DTD
SOXCustomerOfferAck.dtd
Version 1.0 Draft
Date: 06/09/2000
ems, Copyright 2000
-->
<!--                                    -->
<!--       Revision History             -->
<!--                                    -->
<!--       SOX top element              -->
<!--                                    -->
<!ELEMENT SOX ((CustOfferAck, TargetServerList, CustomerOffer+) | (CustOfferAck, CustomerOffer+))>
<!ATTLIST SOX
Version CDATA #REQUIRED
CustomerOfferCount CDATA #REQUIRED
SOXType (CustomerOfferAck) #REQUIRED
>
<!--                                                                           -->
<!--       Customer Offer Acknowledgement elements: For this Customer Offer document.    -->
<!--                                                                           -->
<!ELEMENT CustOfferAck (DistributorID, AckRequested, SenderDocUID, SessionID, OfrRcptCtrlID, SenderID,
Date, Time, TimeZone)>
<!ELEMENT DistributorID (#PCDATA)>
<!ELEMENT AckRequested (#PCDATA)>
<!ELEMENT SenderDocUID (#PCDATA)>
<!ELEMENT SessionID (#PCDATA)>
<!ELEMENT OfrRcptCtrlID (#PCDATA)>
<!ELEMENT SenderID (#PCDATA)>
<!ELEMENT Date (Year, Month, Day)>
<!ELEMENT Year (#PCDATA)>
<!ELEMENT Month (#PCDATA)>
<!ELEMENT Day (#PCDATA)>
<!ELEMENT Time (Hour, Minute, Second)>
<!ELEMENT Hour (#PCDATA)>
<!ELEMENT Minute (#PCDATA)>
<!ELEMENT Second (#PCDATA)>
<!ELEMENT TimeZone (#PCDATA)>
<!--                                                                           -->
<!--       Status and Result elements: For each Customer Offer Agent Server Routing Request    -->
<!--                                                                           -->
<!ELEMENT TargetServerList (Server+)>
<!ATTLIST TargetServerList
ServerCount CDATA #REQUIRED
>
<!ELEMENT Server (ServerID, ServicePriority, Status, Result)>
<!ELEMENT ServerID (#PCDATA)>
<!ELEMENT ServicePriority (#PCDATA)>
<!ELEMENT Status (#PCDATA)>
<!ELEMENT Result (ResultCode, ResultSeverity, ResultDescription, ResultCondition)>
<!ELEMENT ResultCode (#PCDATA)>
<!ELEMENT ResultSeverity (#PCDATA)>
<!ELEMENT ResultDescription (#PCDATA)>
<!ELEMENT ResultCondition (#PCDATA)>
<!--                                    -->
<!--       Customer Offer element:      -->
<!--                                    -->
<!ELEMENT CustomerOffer ((CustOfferMaintReq, CustOfferRouteReq) | (CustOfferMaintReq) |
(CustOfferRouteReq))>
<!ATTLIST CustomerOffer
OfferID CDATA #REQUIRED
MerchantID CDATA #REQUIRED
CustomerID CDATA #REQUIRED
>
<!--                                                -->
<!--       Customer Offer Maintenance Request element   -->
<!--                                                -->
<!ELEMENT CustOfferMaintReq (CustOfferProperties, CustOfferRewards)?>
<!ATTLIST CustOfferMaintReq
Action (Add | Replace | Delete | Activate) #REQUIRED
>
<!--                                                              -->
<!--       Status and Result elements: For Customer Offer Properties   -->
<!--                                                              -->
<!ELEMENT CustOfferProperties (Status, Result)>
<!--                                                                  -->
<!--       Status and Result elements: For each Customer Offer Rewards Set   -->
<!--                                                                  -->
<!ELEMENT CustOfferRewards (RewardSet+)>
<!ATTLIST CustOfferRewards
```

APPENDIX 1-continued

```
RewardSetCount CDATA #REQUIRED
>
<!ELEMENT RewardSet (Status, Result)>
<!ATTLIST RewardSet
RewardSetID (0 | 1 | 2 | 3 | 4 | 5 | 6 | 7) #REQUIRED
>
<!--                                                                    -->
<!--     Status and Result elements: For each Customer Offer Store Route Request  -->
<!--                                                                    -->
<!ELEMENT CustOfferRouteReq (StoreList+)>
<!ELEMENT StoreList (Store+)>
<!ATTLIST StoreList
Action (Add | Replace | Delete | Activate) #REQUIRED
StoreCount CDATA #REQUIRED
>
<!ELEMENT Store (StoreID, ServicePriority, Status, Result)>
<!ELEMENT StoreID (#PCDATA)>
1.1 DTD: SOXErrorResponse.dtd.

<?xml version="1.0" encoding="UTF-8"?>
<!--
Standard Offer Exchange: Error Response DTD
SOXErrorReponse.dtd
Version 1.0 Draft
Date: 06/09/2000
ems, Copyright 2000
-->
<!--                                -->
<!--     Revision History           -->
<!--                                -->
<!--     SOX top element            -->
<!--                                -->
<!ELEMENT SOX (ErrorResponse)>
<!ATTLIST SOX
Version CDATA #REQUIRED
SOXType (ErrorResponse) #REQUIRED
>
<!--                                                                    -->
<!--     Error Response element: For this document.                     -->
<!--                                                                    -->
<!ELEMENT ErrorResponse (SenderDocUID, ErrorCode, ErrorDescription, ErrorCondition, ErrorMessage,
ErrorSource, Date, Time, TimeZone, SessionID, OfrRcptCtrlID, SenderID, DTDErrorList)>
<!ELEMENT SenderDocUID (#PCDATA)>
<!ELEMENT ErrorCode (#PCDATA)>
<!ELEMENT ErrorDescription (#PCDATA)>
<!ELEMENT ErrorCondition (#PCDATA)>
<!ELEMENT ErrorMessage (#PCDATA)>
<!ELEMENT ErrorSource (#PCDATA)>
<!ELEMENT Date (Year, Month, Day)>
<!ELEMENT Year (#PCDATA)>
<!ELEMENT Month (#PCDATA)>
<!ELEMENT Day (#PCDATA)>
<!ELEMENT Time (Hour, Minute, Second)>
<!ELEMENT Hour (#PCDATA)>
<!ELEMENT Minute (#PCDATA)>
<!ELEMENT Second (#PCDATA)>
<!ELEMENT TimeZone (#PCDATA)>
<!ELEMENT SessionID (#PCDATA)>
<!ELEMENT OfrRcptCtrlID (#PCDATA)>
<!ELEMENT SenderID (#PCDATA)>
<!ELEMENT DTDErrorList (DTDError+)>
<!ATTLIST DTDErrorList
DTDErrorCount CDATA #REQUIRED
>
<!ELEMENT DTDError (PathName, ErrorCode, ErrorMessage)>
<!ELEMENT PathName (#PCDATA)>
```

We claim:

1. An electronic offer management system for electronic offer transactions, comprising:
    an electronic offer intake interface adapted to electronically process a plurality of electronic offers from a plurality of competitive offer distributors, the interface comprising:
        receiving means for receiving information related to the plurality of electronic offers distributed by the plurality of competitive offer distributors to customers for redemption at a plurality of stores;
        routing means for automatically routing the information related to each electronic offer to a point-of-sale system of each store in which the offer can be redeemed; and
        clearing means for automatically clearing the electronic offers redeemed by the customers at the stores.

2. An electronic network for managing electronic offer transactions, the network comprising:

one or more maintenance files, each maintenance file including one or more distributed electronic offers, and each distributed offer having at least one offer property, at least one condition, and at least one reward;

a router to distribute the one or more distributed offers to one or more point-of-sale systems for redemption;

a transaction log file received from one of the point-of-sale systems, the transaction log file including one or more redeemed offers; and a server to clear one or more offers being redeemed by a customer with the one or more distributed offers.

3. A network as set forth in claim 2 wherein the server is operable to receive the one or more distributed offers from one or more distributors, and to create the one or more maintenance files having the one or more distributed offers.

4. A network as set forth in claim 3 wherein the server is further operable to authenticate that each distributed offer has a valid format.

5. A network as set forth in claim 2 wherein the network includes a database, and wherein the one or more maintenance files are stored in the database.

6. A network as set forth in claim 5 wherein one or more aspects of the database are viewable by a consumer via a browser interface.

7. A network as set forth in claim 5 wherein one or more aspects of the database are viewable by a consumer via a kiosk.

8. A network as set forth in claim 2 wherein the server includes the router.

9. A network as set forth in claim 2 wherein each distributed offer further includes a unique reference code.

10. A network as set forth in claim 2 wherein each distributed offer further includes an identity of the distributor.

11. A network as set forth in claim 2 wherein the distributed offer is a consumer-specific distributed offer.

12. A network as set forth in claim 2 wherein the server clears the one or more redeemed offers with the one or more distributed offers by being operable to prepare one or more settlement details.

13. A network as set forth in claim 12, wherein the at least one reward includes a deferred award.

14. A network as set forth in claim 13, wherein the deferred award is an award for the customer.

15. A network as set forth in claim 12 wherein the server is further operable to communicate the one or more settlement details to a settlement agent.

16. A network as set forth in claim 2 wherein the server is further operable to accrue data relating to the redeemed offers, and to profile the accrued data.

17. A network as set forth in claim 16 wherein the server is further operable to communicate the profile to the one or more distributors.

18. A network as set forth in claim 16 wherein the profile is selected from the group of a static profile, a persistent profile, and a dynamic profile.

19. A network as set forth in claim 2 wherein the at least one offer property includes whether the offer is open to the public.

20. A network as set forth in claim 2 wherein the at least one offer property includes whether the offer is being offered by a vendor or a store.

21. A network as set forth in claim 2 wherein the at least one offer property includes the maximum number of times the offer may be used by a consumer per transaction.

22. A network as set forth in claim 2 wherein the at least one offer property includes the maximum number of times the offer may be used by a consumer across transactions.

23. A network as set forth in claim 2 wherein the at least one offer property includes the date and time when the offer becomes active.

24. A network as set forth in claim 2 wherein the at least one offer property includes the date and time when the offer becomes inactive.

25. A network as set forth in claim 2 wherein the at least one offer property includes a text description of the offer.

26. A network as set forth in claim 2 wherein the at least one offer property includes the unique number used to identify a sponsor of each offer.

27. A network as set forth in claim 2 wherein the at least one offer property includes whether a reward is to be received in the future.

28. A network as set forth in claim 2 wherein the at least one condition includes one or more items that must be purchased.

29. A network as set forth in claim 28 wherein the at least one condition includes the one or more departments from which each of the one or more items must be purchased.

30. A network as set forth in claim 2 wherein the at least one condition includes the amount of total purchases required.

31. A network as set forth in claim 2 wherein the at least one condition includes the one or more days the offer may be redeemed.

32. A network as set forth in claim 2 wherein the at least one condition is selected from the group of an item purchase condition, a department purchase condition, a total purchase condition, a time of day condition, and a day of week condition.

33. A network as set forth in claim 2 wherein the at least one reward is selected from the group of an item discount reward, a department discount award, a total discount award, a free item reward, and a replacement price reward.

* * * * *

UNITED STATES PATENT AND TRADEMARK OFFICE
CERTIFICATE OF CORRECTION

PATENT NO. : 7,076,444 B1
APPLICATION NO. : 09/665790
DATED : July 11, 2006
INVENTOR(S) : Baron et al.

It is certified that error appears in the above-identified patent and that said Letters Patent is hereby corrected as shown below:

In the specification:

There are numerous instances in the strings of code in which the Patent Office broke up certain words (i.e., page 10, line 23, the string "/TotalPurchase" appears as "/Total (space) Purchase." In addition, to the extent a line of code did not fit on one line, the Patent Office did not number the line on which the second half of the code appears. For this reason, we respectfully request that the enclosed charts are reprinted with this Certificate of Correction:

1. Column 3, chart: "Element/Attribute Tag"
2. Columns 4-18, charts: "XML Element/Attribute Tag"
3. Column 20, chart: "XML Element/Attribute Tag"
4. Column 21, line 45: insert --/-- after DeptDiscount.
5. Column 23, line 50: insert --.-- after "[]".
6. Columns 28-39, we request that the complete charts are attached here as originally filed because the "[ ]" appear like boxes
7. Column 29, top chart: the "[ ]" appear like boxes.
8. Columns 29-30: remove the second line entitled: " Offer Store Routing Acknowledgement"
9. Columns 31-32, line 59: replace "audt:" with --audit--
10. Columns 33-34: Insert --Request-- in title of second chart after "Maintenance" and before "Acknowledgement"

Signed and Sealed this

Twenty-third Day of October, 2007

JON W. DUDAS
*Director of the United States Patent and Trademark Office*